US012398593B2

(12) United States Patent
Colson et al.

(10) Patent No.: US 12,398,593 B2
(45) Date of Patent: *Aug. 26, 2025

(54) ARCHITECTURAL COVERING AND METHOD OF MANUFACTURING

(71) Applicant: Hunter Douglas, Inc., Pearl River, NY (US)

(72) Inventors: Wendell B. Colson, Weston, MA (US); Paul G. Swiszcz, Niwot, CO (US)

(73) Assignee: Hunter Douglas Inc., Pearl River, NY (US)

(*) Notice: Subject to any disclaimer, the term of this patent is extended or adjusted under 35 U.S.C. 154(b) by 322 days.

This patent is subject to a terminal disclaimer.

(21) Appl. No.: 18/107,302

(22) Filed: Feb. 8, 2023

(65) Prior Publication Data

US 2023/0184030 A1 Jun. 15, 2023

Related U.S. Application Data

(63) Continuation of application No. 16/843,136, filed on Apr. 8, 2020, now Pat. No. 11,608,678, which is a (Continued)

(51) Int. Cl.

*E06B 9/386* (2006.01)
*E06B 9/262* (2006.01)

(Continued)

(52) U.S. Cl.

CPC .............. *E06B 9/264* (2013.01); *E06B 9/262* (2013.01); *E06B 9/266* (2013.01); *E06B 9/34* (2013.01);

(Continued)

(58) Field of Classification Search

CPC . E06B 9/264; E06B 9/262; E06B 9/34; E06B 9/386; E06B 2009/2627;

(Continued)

(56) References Cited

U.S. PATENT DOCUMENTS 496,204 A 4/1893 Perry
1,962,868 A 6/1934 Gregg (Continued)

FOREIGN PATENT DOCUMENTS

CN 1110483 A 10/1995
CN 1549884 A 11/2004

(Continued)

*Primary Examiner* — Daniel P Cahn
*Assistant Examiner* — Jeremy C Ramsey
(74) *Attorney, Agent, or Firm* — Dority & Manning, P.A.

(57) ABSTRACT

An architectural covering and a method of manufacturing the covering is provided. The panel may include multiple strips of material extending lengthwise across a width dimension of the panel. The strips of material may be overlapped and coupled to one another to define cells between adjacent strips of material. The panel may be retracted and extended across an architectural opening, and the strips of material may include a resilient support member to expand the cells as the panel is extended across the architectural opening. The panel may be manufactured by helically winding a continuous, elongate strip of material about a drum in an overlapped manner.

16 Claims, 16 Drawing Sheets

Related U.S. Application Data continuation of application No. 15/418,804, filed on Jan. 30, 2017, now Pat. No. 10,648,229.

(60) Provisional application No. 62/357,237, filed on Jun. 30, 2016.

(51) Int. Cl.
*E06B 9/264* (2006.01)
*E06B 9/266* (2006.01)
*E06B 9/34* (2006.01)

(52) U.S. Cl.
CPC ...... *E06B 9/386* (2013.01); *E06B 2009/2627* (2013.01)

(58) Field of Classification Search
CPC ............ E06B 9/266; E06B 2009/2429; E06B 2009/2423; E06B 9/26; E06B 9/40
See application file for complete search history.

(56) References Cited

U.S. PATENT DOCUMENTS 2,012,887 A 8/1935 Major
2,024,090 A 12/1935 Cadmus
2,042,002 A 5/1936 Hovey
2,200,605 A 5/1940 Pierce
2,231,778 A 2/1941 Swanson
2,267,867 A 12/1941 Kienle
2,267,869 A 12/1941 Loehr
2,620,869 A 12/1952 Friedman
2,874,612 A 2/1959 Luboshez
3,467,037 A 9/1969 Frydryk
3,990,201 A 11/1976 Falbel
4,002,159 A 1/1977 Angilletta
4,039,019 A 8/1977 Hopper
4,066,062 A 1/1978 Houston
4,078,323 A 3/1978 Baumgarten
4,194,550 A 3/1980 Hopper
4,220,189 A 9/1980 Marquez
4,247,599 A 1/1981 Hopper
4,279,240 A 7/1981 Artusy
4,301,787 A 11/1981 Rice
4,338,996 A 7/1982 Frank
4,359,079 A 11/1982 Bledsoe
4,382,436 A 5/1983 Hager
4,452,656 A 6/1984 Benson et al.
4,458,739 A 7/1984 Murray et al.
4,512,836 A 4/1985 Tucci
4,532,917 A 8/1985 Taff et al.
4,535,828 A 8/1985 Brockhaus
4,550,758 A 11/1985 Johnson et al.
4,579,107 A 4/1986 Deakin
4,638,844 A 1/1987 Hayashiguchi
4,649,980 A 3/1987 Kunz
4,658,806 A 4/1987 Boozer
4,692,744 A 9/1987 Hickman
4,722,382 A 2/1988 Vecchiarelli
4,732,201 A 3/1988 Dillitzer
4,736,785 A 4/1988 Seuster
4,763,890 A 8/1988 Zimmerman et al.
4,800,946 A 1/1989 Rosenoy
5,090,098 A 2/1992 Seveik et al.
5,097,884 A 3/1992 Sevcik et al.
5,123,473 A 6/1992 Henkenjohann
5,129,440 A 7/1992 Colson
5,158,632 A 10/1992 Colson et al.
5,217,000 A 6/1993 Pierce-Bjorklund
5,223,313 A 6/1993 Holzer et al.
5,320,154 A 6/1994 Colson et al.
5,325,579 A 7/1994 Baier
D352,856 S 11/1994 Ford
5,390,720 A 2/1995 Colson et al.
5,419,385 A 5/1995 Vogel et al.
5,467,266 A 11/1995 Jacobs et al.
5,503,210 A 4/1996 Colson et al.
5,547,006 A 8/1996 Auger
5,566,738 A 10/1996 Yadidya
5,600,974 A 2/1997 Schnegg et al.
5,603,368 A 2/1997 Colson et al.
5,638,881 A 6/1997 Ruggles et al.
5,649,583 A 7/1997 Hsu
5,712,332 A 1/1998 Kaieda et al.
5,787,951 A 8/1998 Tonomura et al.
5,876,545 A 3/1999 Swiszcz et al.
5,897,731 A 4/1999 Colson et al.
5,909,763 A 6/1999 Link et al.
5,974,763 A 11/1999 Colson et al.
6,006,812 A 12/1999 Corey
6,024,819 A 2/2000 Corey
6,052,966 A 4/2000 Colson et al.
6,057,029 A 5/2000 Demestre et al.
6,076,588 A 6/2000 Swiszcz et al.
6,094,290 A 7/2000 Crawford et al.
6,103,336 A 8/2000 Swiszcz
D439,785 S 4/2001 Throne
D440,102 S 4/2001 Colson et al.
D444,658 S 7/2001 Swiszcz et al.
6,257,302 B1 7/2001 Bednarczyk et al.
D446,416 S 8/2001 Throne
6,302,982 B1 10/2001 Corey et al.
6,345,486 B1 2/2002 Colson et al.
6,354,353 B1 3/2002 Green et al.
6,374,896 B1 4/2002 Møeller
D459,933 S 7/2002 Goodman
6,416,842 B1 7/2002 Swiszcz et al.
6,461,464 B1 10/2002 Swiszcz
6,470,950 B2 10/2002 Shimizu
6,484,390 B1 11/2002 Gouldson et al.
6,589,613 B1 7/2003 Kunert
6,613,404 B2 9/2003 Johnson
6,688,369 B2 2/2004 Colson et al.
6,745,811 B1 6/2004 Nien
6,758,211 B1 7/2004 Schmidt
D496,204 S 9/2004 Tuzman
6,792,994 B2 9/2004 Lin
D498,105 S 11/2004 Tyner
6,860,079 B2 3/2005 Schwarz
D503,578 S 4/2005 Boehm
6,904,948 B2 6/2005 Auger et al.
6,913,058 B1 7/2005 Takagi
6,981,509 B2 1/2006 Sharapov
6,982,020 B2 1/2006 Swiszcz et al.
7,058,292 B2 6/2006 Hirano
7,063,122 B2 6/2006 Colson et al.
7,100,666 B2 9/2006 Colson et al.
7,111,659 B2 9/2006 Harper et al.
7,191,816 B2 3/2007 Colson et al.
7,409,980 B1 8/2008 Heissenberg
7,417,397 B2 8/2008 Berman et al.
7,418,313 B2 8/2008 Devis et al.
7,500,505 B2 3/2009 Smith et al.
7,513,292 B2 4/2009 Auger et al.
7,549,455 B2 6/2009 Harper et al.
7,588,068 B2 9/2009 Colson et al.
7,637,301 B2 12/2009 Forst Randle
7,708,047 B2 5/2010 Auger
D622,964 S 9/2010 Colson
D632,493 S 2/2011 Colson et al.
D636,204 S 4/2011 Elinson et al.
D640,472 S 6/2011 Colson et al.
7,971,624 B2 7/2011 Harper et al.
7,975,747 B2 7/2011 Liang et al.
8,020,602 B2 9/2011 Smith et al.
D646,516 S 10/2011 Ehrsam
8,082,916 B2 12/2011 Colson
D657,176 S 4/2012 Stern
8,171,640 B2 5/2012 Colson et al.
8,220,518 B2 7/2012 Judkins
D668,090 S 10/2012 Colson et al.
D671,349 S 11/2012 Judkins
8,405,901 B2 3/2013 Boote
D685,210 S 7/2013 Josephson et al.
D686,433 S 7/2013 Marocco

(56) References Cited

U.S. PATENT DOCUMENTS

| | | | |
|---|---|---|---|
| 8,496,768 | B2 | 7/2013 | Holt et al. |
| D691,397 | S | 10/2013 | Colson et al. |
| D692,684 | S | 11/2013 | Colson et al. |
| D693,600 | S | 11/2013 | Jelic et al. |
| 8,587,242 | B2 | 11/2013 | Berman et al. |
| 8,639,387 | B2 | 1/2014 | Byberg et al. |
| 8,757,239 | B2 | 6/2014 | Colson et al. |
| 8,763,673 | B2 | 7/2014 | Jelic et al. |
| 8,820,384 | B2 | 9/2014 | Boillot |
| 8,827,347 | B2 | 9/2014 | Snider |
| 8,951,372 | B2 | 2/2015 | Van Nutt et al. |
| D734,061 | S | 7/2015 | Colson et al. |
| 9,080,377 | B2 | 7/2015 | Holt et al. |
| 9,081,171 | B2 | 7/2015 | Dean et al. |
| 9,097,842 | B2 | 8/2015 | Van Nutt et al. |
| 9,109,812 | B2 | 8/2015 | Colson |
| 9,130,097 | B2 | 9/2015 | Taheri et al. |
| 9,249,618 | B2 | 2/2016 | Sevcik et al. |
| 9,256,085 | B2 | 2/2016 | McCarthy et al. |
| 9,376,860 | B2 | 6/2016 | Josephson et al. |
| 9,382,754 | B2 | 7/2016 | Malkan |
| D764,836 | S | 8/2016 | Rupel |
| 9,458,663 | B2 | 10/2016 | Colson et al. |
| 9,540,874 | B2 | 1/2017 | Colson et al. |
| 2001/0037849 | A1 | 11/2001 | Corey et al. |
| 2002/0088559 | A1 | 7/2002 | Green et al. |
| 2003/0000171 | A1 | 1/2003 | Schwarz |
| 2003/0098133 | A1 | 5/2003 | Palmer |
| 2004/0065416 | A1 | 4/2004 | Auger et al. |
| 2004/0144498 | A1 | 7/2004 | Hudoba et al. |
| 2004/0163773 | A1 | 8/2004 | Murray |
| 2005/0150608 | A1 | 7/2005 | Auger et al. |
| 2005/0155722 | A1 | 7/2005 | Colson et al. |
| 2005/0205217 | A1 | 9/2005 | Harper et al. |
| 2006/0000558 | A1 | 1/2006 | Fennell |
| 2006/0157205 | A1 | 7/2006 | Auger |
| 2006/0179991 | A1 | 8/2006 | Nien et al. |
| 2006/0191646 | A1 | 8/2006 | Harper et al. |
| 2006/0207730 | A1 | 9/2006 | Berman et al. |
| 2006/0247377 | A1 | 11/2006 | Riegel et al. |
| 2007/0039699 | A1 | 2/2007 | Colson et al. |
| 2007/0051456 | A1 | 3/2007 | Judkins |
| 2007/0074826 | A1 | 4/2007 | Jelic et al. |
| 2007/0088104 | A1 | 4/2007 | Hung et al. |
| 2007/0251652 | A1 | 11/2007 | Anthony et al. |
| 2008/0014446 | A1 | 1/2008 | Donea et al. |
| 2008/0066277 | A1 | 3/2008 | Colson et al. |
| 2008/0127598 | A1 | 6/2008 | Kallstrom |
| 2008/0264572 | A1 | 10/2008 | Forst Randle |
| 2008/0303686 | A1 | 12/2008 | Mosbrucker |
| 2009/0090072 | A1 | 4/2009 | To |
| 2009/0205789 | A1 | 8/2009 | Watkins et al. |
| 2009/0321024 | A1 | 12/2009 | Harper et al. |
| 2010/0038841 | A1 | 2/2010 | Bader et al. |
| 2010/0126675 | A1 | 5/2010 | Jelic et al. |
| 2010/0154783 | A1 | 6/2010 | Colson |
| 2010/0186903 | A1 | 7/2010 | Liang et al. |
| 2010/0218841 | A1 | 9/2010 | Chang et al. |
| 2010/0266801 | A1 | 10/2010 | Jahoda et al. |
| 2010/0276088 | A1 | 11/2010 | Jelic et al. |
| 2010/0276089 | A1 | 11/2010 | Jelic et al. |
| 2010/0288446 | A1 | 11/2010 | Foley et al. |
| 2011/0088324 | A1 | 4/2011 | Wessel |
| 2011/0088852 | A1 | 4/2011 | Hu et al. |
| 2011/0094689 | A1 | 4/2011 | Dwarka |
| 2011/0126959 | A1 | 6/2011 | Holt et al. |
| 2011/0133940 | A1 | 6/2011 | Margalit |
| 2011/0146922 | A1 | 6/2011 | Colson et al. |
| 2011/0170170 | A1 | 7/2011 | Boote |
| 2011/0220303 | A1 | 9/2011 | Colson |
| 2012/0038841 | A1 | 2/2012 | Taheri et al. |
| 2012/0118514 | A1 | 5/2012 | Hughes |
| 2012/0222722 | A1 | 9/2012 | Baruchi et al. |
| 2012/0241104 | A1 | 9/2012 | Huffer et al. |
| 2012/0318475 | A1 | 12/2012 | Glover |
| 2013/0032301 | A1 | 2/2013 | Lin |
| 2013/0038093 | A1 | 2/2013 | Snider |
| 2013/0061846 | A1 | 3/2013 | Colson et al. |
| 2013/0098565 | A1 | 4/2013 | Colson et al. |
| 2013/0105094 | A1 | 5/2013 | Colson et al. |
| 2013/0128336 | A1 | 5/2013 | Dean et al. |
| 2013/0180676 | A1 | 7/2013 | Berman et al. |
| 2013/0228290 | A1 | 9/2013 | Rupel et al. |
| 2013/0240158 | A1 | 9/2013 | Chen |
| 2014/0014261 | A1 | 1/2014 | Chen |
| 2014/0034251 | A1 | 2/2014 | Colson et al. |
| 2014/0053989 | A1 | 2/2014 | Colson et al. |
| 2014/0168779 | A1 | 6/2014 | Malkan |
| 2014/0250804 | A1 | 9/2014 | Kuperus et al. |
| 2014/0284004 | A1 | 9/2014 | Sevcik et al. |
| 2014/0366469 | A1 | 12/2014 | Hodgson et al. |
| 2015/0041072 | A1 | 2/2015 | Hsu et al. |
| 2015/0096695 | A1 | 4/2015 | Baker et al. |
| 2015/0129140 | A1 | 5/2015 | Dean et al. |
| 2015/0184450 | A1 | 7/2015 | Rupel |
| 2015/0184459 | A1 | 7/2015 | Wang et al. |
| 2015/0191959 | A1 | 7/2015 | Schmohl et al. |
| 2015/0322714 | A1 | 11/2015 | Rupel |

FOREIGN PATENT DOCUMENTS

| | | | |
|---|---|---|---|
| CN | 2703855 | Y | 6/2005 |
| CN | 1918356 | A | 2/2007 |
| CN | 201194726 | Y | 2/2009 |
| CN | 101984889 | A | 3/2011 |
| CN | 102007262 | A | 4/2011 |
| CO | 6920275 | A2 | 10/2014 |
| DE | 70451 | C | 8/1893 |
| DE | 2709207 | A1 | 9/1978 |
| DE | 3912528 | A1 | 10/1990 |
| EP | 0427477 | A2 | 5/1991 |
| EP | 0511956 | A1 | 11/1992 |
| EP | 0818601 | A1 | 1/1998 |
| EP | 2113626 | A2 | 11/2009 |
| GB | 1494842 | A | 12/1977 |
| JP | H08511591 | A | 12/1996 |
| JP | 3832007 | B2 | 10/2006 |
| TW | 244361 | B | 4/1995 |
| TW | 245658 | B | 4/1995 |
| TW | 310303 | B | 7/1997 |
| TW | i224650 | A | 12/2004 |
| WO | 9704207 | A1 | 2/1997 |
| WO | 0206619 | A1 | 1/2002 |
| WO | 0241740 | A1 | 5/2002 |
| WO | 03008751 | A1 | 1/2003 |
| WO | 2005062875 | A2 | 7/2005 |
| WO | 2005098190 | A1 | 10/2005 |
| WO | 2009103045 | A2 | 8/2009 |
| WO | 2010059581 | A2 | 5/2010 |
| WO | 2011130593 | A2 | 10/2011 |
| WO | 2012142519 | A1 | 10/2012 |
| WO | 2012142522 | A1 | 10/2012 |

ARCHITECTURAL COVERING AND METHOD OF MANUFACTURING

CROSS-REFERENCE TO RELATED APPLICATIONS

This application is a continuation of co-pending U.S. patent application Ser. No. 16/843,136, filed Apr. 8, 2020, entitled "Architectural Covering and Method of Manufacturing", which is a continuation of U.S. patent application Ser. No. 15/418,804, filed Jan. 30, 2017, now U.S. Pat. No. 10,648,229, entitled "Architectural Covering and Method of Manufacturing", which application claims the benefit of priority under 35 U.S.C. § 119(e) of the earlier filing date of U.S. Provisional Patent Application No. 62/357,237, filed 30 Jun. 2016 and entitled "Architectural Covering and Method of Manufacturing," which are all hereby incorporated in their entireties.

FIELD

The present disclosure relates generally to architectural coverings and methods of manufacturing architectural coverings, and more particularly to a panel of an architectural covering and a method of manufacturing the panel.

BACKGROUND

Coverings for architectural structures or features (such as walls and openings, including windows, doors, archways, and the like) (hereinafter "architectural structure" for the sake of convenience without intent to limit) have assumed numerous forms for many years. Some coverings include a panel that defines multiple cells that trap air to increase the insulative factor of the covering. In some coverings, the panels are retractable or extendable across the architectural opening to alter the amount of light passage and visibility through the architectural opening. During retraction of the panel, the cells may collapse to decrease the volume of the cells, thereby providing a smaller panel to store along a side of the architectural opening. During extension of the panel, the cells may expand to increase the volume of the cells, thereby increasing the air trapped within the cells to increase the insulative factor of the panel.

U.S. Patent Publication No. 2014/0053989 describes a panel including a support sheet and at least one cell operably connected to the support sheet. The at least one cell may include a vane material operably connected to a first side of the support sheet and a cell support member operably connected to the vane material and configured to support the vane material at a distance away from the support sheet when the panel is in an extended position with respect to the support tube.

U.S. Patent Publication No. 2013/0105094 describes a process and system for manufacturing roller blinds which includes structure for performing plural steps including a first step of helically winding slat fabric about a drum, thereby forming a slat product. A second step includes moving the slat product from the drum to a platform. A third step includes winding the slat product about a roller tube to form a roller blind. A fourth step includes moving the blind from the platform to a heat treating device.

SUMMARY

The present disclosure is at least partially directed to a panel and method of manufacturing a panel and generally provides a user with different panel and manufacturing options.

The present disclosure generally provides an architectural covering including a panel and a method of manufacturing the panel. The panel may include multiple strips of material extending lengthwise across a width dimension of the panel. The strips of material may be overlapped and operably coupled to one another to define cells between adjacent strips of material. The panel may be retracted and extended across an architectural structure, and the strips of material may include a resilient support member to expand the cells as the panel is extended across the architectural structure. The panel may be manufactured by helically winding a continuous, elongate strip of material about a drum in an overlapped manner.

The present disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular examples or arrangements illustrated herein.

BRIEF DESCRIPTION OF THE DRAWINGS

The accompanying drawings, which are incorporated into and constitute a part of the specification, illustrate examples of the disclosure and, together with the general description given above and the detailed description given below, serve to explain principles of these examples.

DETAILED DESCRIPTION

Figure 1:
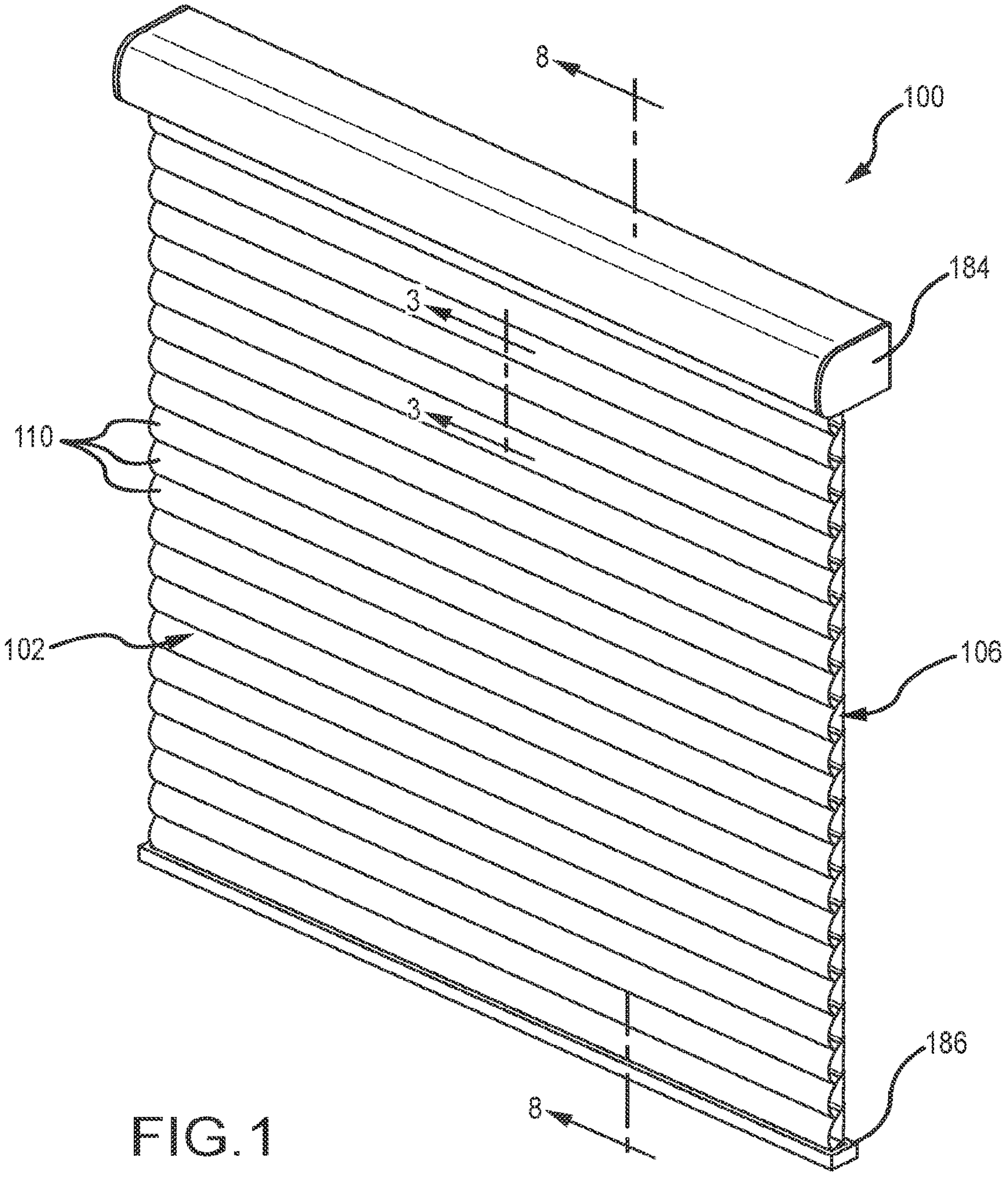
FIG. 1 is an isometric view of an architectural covering in accordance with an embodiment of the present disclosure.

In FIG. 1, the present disclosure illustrates an example of a covering 100 for an architectural structure that includes a panel 102. The panel 102 may include multiple strips of material 110 extending lengthwise across a width dimension of the panel 102. The strips of material 110 may be overlapped and operably coupled to one another to define a cell between adjacent strips of material, thereby forming a cellular panel. The panel 102 may be retracted and extended across an architectural structure, and the strips of material 110 may include a resilient support member to expand the cells as the panel 102 is extended across the architectural structure. The panel 102 may be manufactured by helically winding a continuous, elongate strip of material about a drum in an overlapped manner.

With continued reference to the illustrative embodiment illustrated in FIG. 1, the panel 102 may be retracted and extended across an architectural structure to adjust, for example, light transmission and/or visibility through the architectural structure. During retraction of the panel 102, strips of material 110 of the panel 102 may generally collapse to decrease the volume of cells 106 formed by the overlapped strips of material 110, thereby facilitating storage of the panel 102 along a side of the architectural structure. During extension of the panel 102, strips of material 110 of the panel 102 may generally expand to increase the volume of cells 106 formed by the overlapped strips of material 110, thereby increasing the air trapped within the cells 106 such as to increase the insulative factor of the panel 102. The panel 102 may be configured so that at least a portion of each strip of material of the panel 102 may be biased to an expanded configuration as the panel 102 is extended across the architectural structure. In some embodiments, the strips of material 110 may be stacked upon one another and may extend laterally across the panel 102. The cells 106 defined by the strips of material 110 may be enclosed along their length and may have open ends. The cells 106 may have various shapes, which may differ from that shown in the illustrated embodiments. Depending on the orientation of the covering 100, the strips of material 110 may extend horizontally or vertically across the architectural opening.

Figure 2:
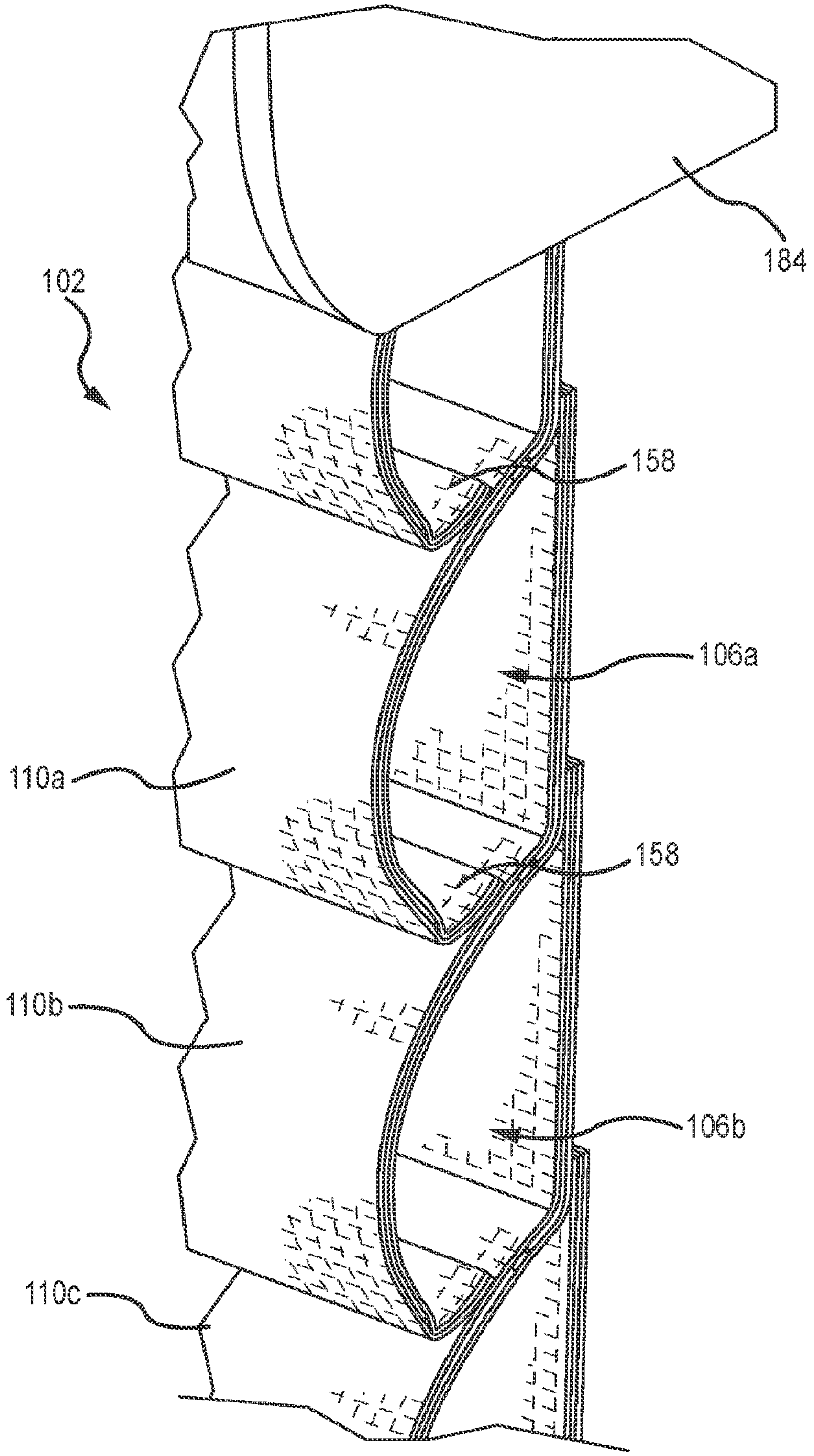
FIG. 2 is a fragmentary, enlarged isometric view of the covering of FIG. 1 in accordance with an embodiment of the present disclosure.
Figure 3:
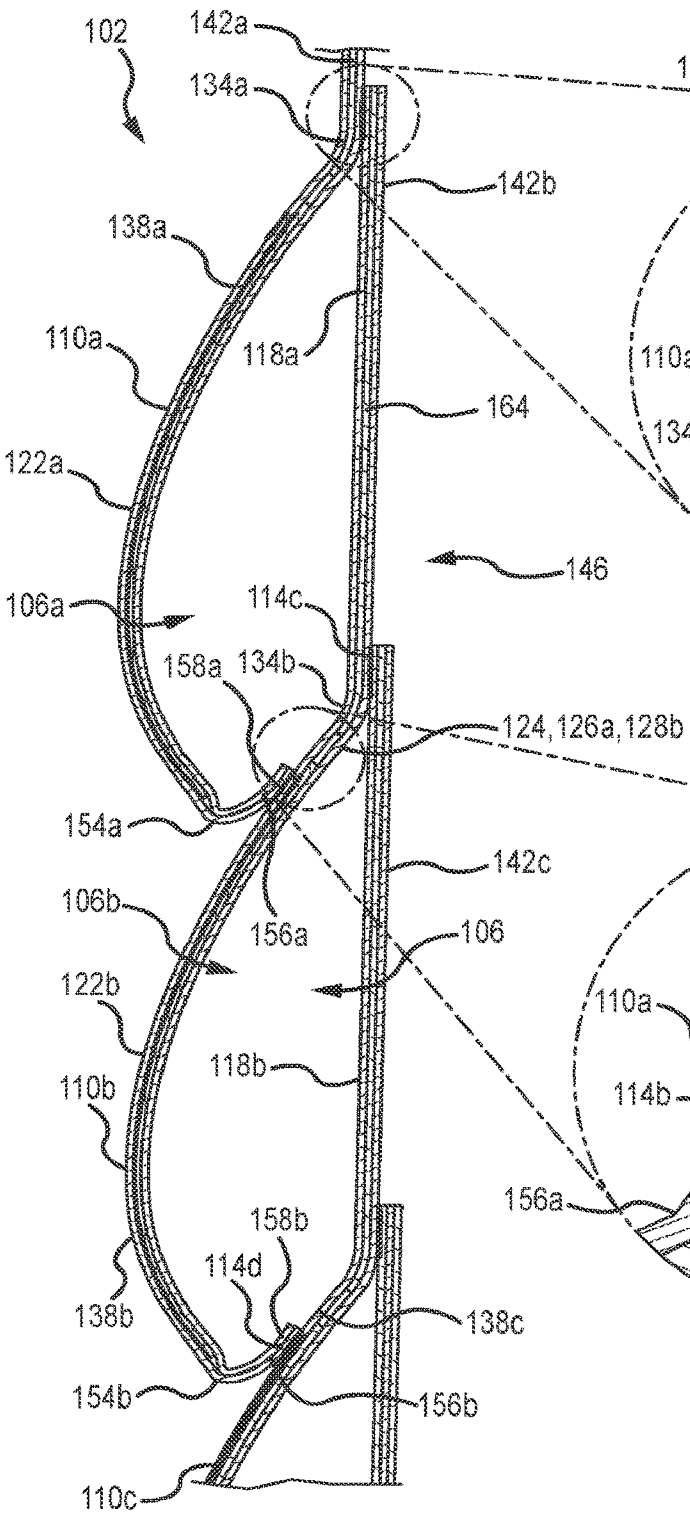
FIG. 3 is a transverse cross-sectional view of the covering of FIG. 1 taken along line 3-3 of FIG. 1 in accordance with an embodiment of the present disclosure.
Figure 4:
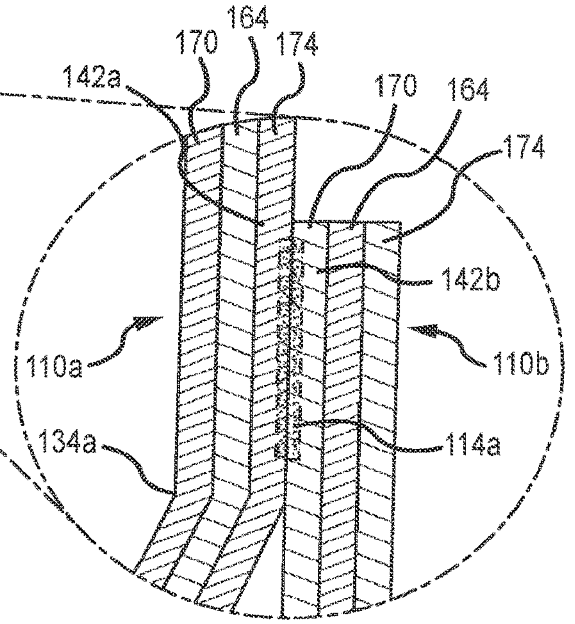
FIG. 4 is an enlarged view of a first coupling line between adjacent strips of material and circumscribed in FIG. 3 in accordance with an embodiment of the present disclosure.
Figure 5:
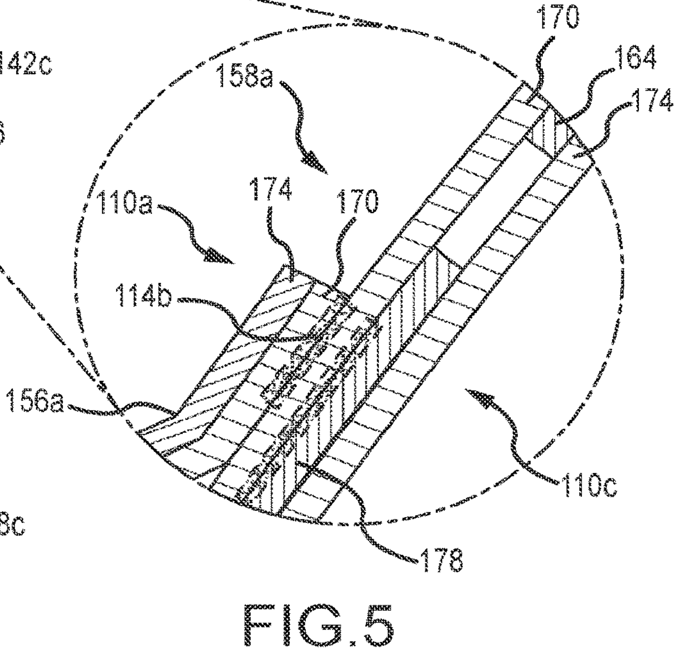
FIG. 5 is an enlarged view of a second coupling line between adjacent strips of material and circumscribed in FIG. 3 in accordance with an embodiment of the present disclosure.
Figure 8:
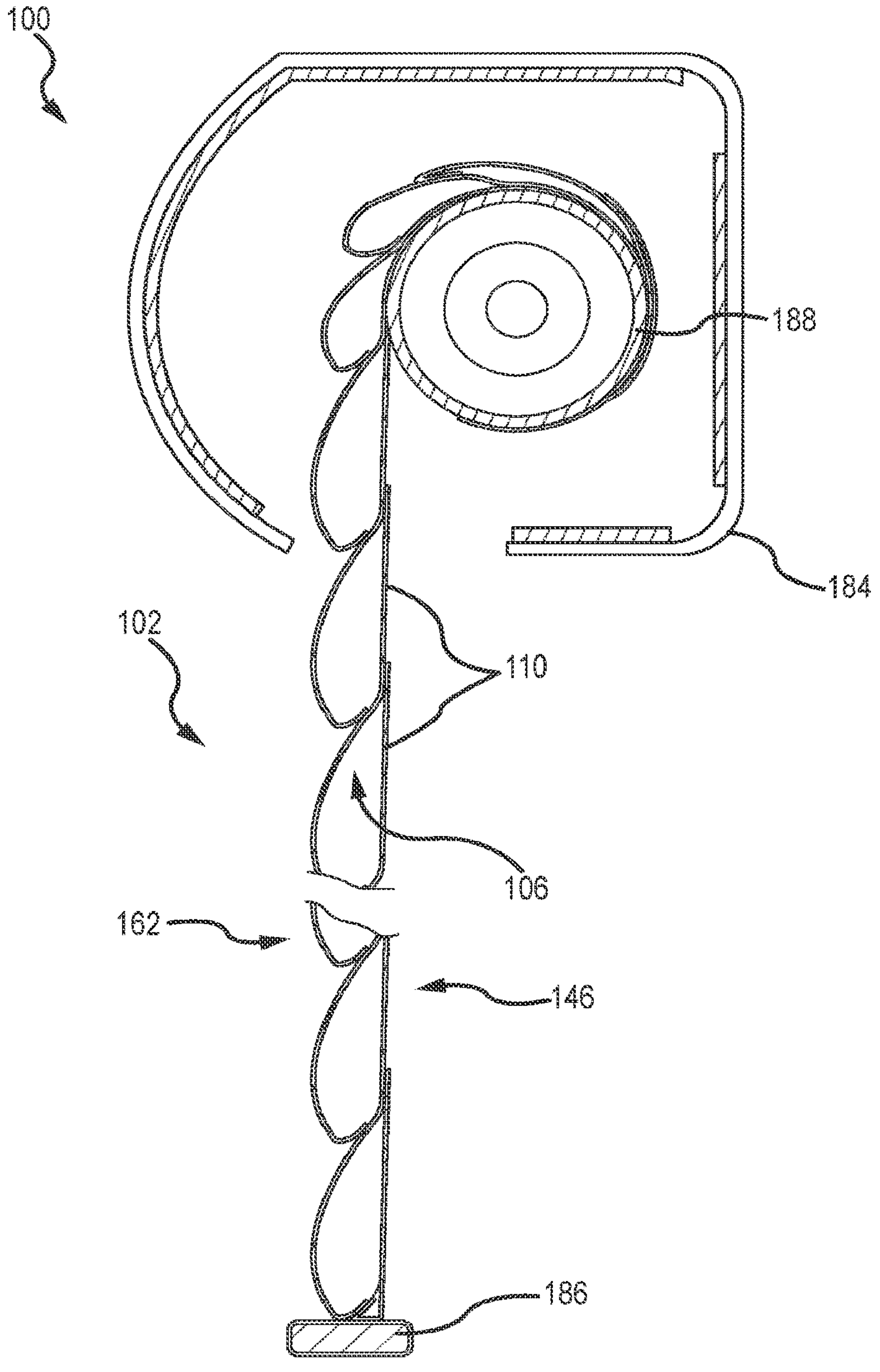
FIG. 8 is a transverse cross-sectional view of the covering of FIG. 1 taken along line 8-8 of FIG. 1 in accordance with an embodiment of the present disclosure.

Referring to the illustrative embodiment of FIGS. 2, 3, and 8, the panel 102 may be manufactured without a support sheet, thereby reducing the cost and complexity of manufacturing the panel 102. The panel 102 may include overlapping strips of material. Referring to the illustrative embodiment of FIGS. 2 and 3, a first elongated strip of material **110*a* and an immediately adjacent second elongated strip of material 110*b* may define an illustrative first cell 106*a* therebetween, and the second elongated strip of material 110*b* and an immediately adjacent third elongated strip of material 110*c* may define an illustrative second cell 106*b* therebetween. Referring specifically to first cell 106*a* in FIG. 3 for illustrative purposes, the first strip of material 110*a* and the second strip of material 110*b* may overlap each other and may be coupled to each other along a first coupling line 114*a* (see FIG. 4) and a second coupling line 114*b* (see FIG. 5) to define cell 106*a* therebetween. The first and second coupling lines 114*a*, 114*b* may extend lengthwise across the panel 102 and may be spaced apart from each other along a length of the panel 102 to define the first cell 106*a* between the first and second strips of material 110*a*, 110*b***.

Referring to FIGS. 2 and 3, each strip of material 110 may form a front wall of one cell and a rear wall of an immediately adjacent cell, thereby eliminating a support sheet for defining a rear wall of the cells. Referring specifically to the illustrative embodiment of FIG. 3, illustrative second strip of material **110*b* may form a rear wall 118*a* of first cell 106*a* and a front wall 122*b* of second cell 106*b*. Illustrative first strip of material 110*a* may form a front wall 122*a* of first cell 106*a*, and illustrative third strip of material 110*c* may form a rear wall 118*b* of second cell 106*b*. A segment 124 of the second strip of material 110*b* extending between rear wall 118*a* and front wall 122*b* may separate the first cell 106*a* and the second cell 106*b* from each other by defining a bottom wall 126*a* of the first cell 106*a* and a top wall 128*b* of the second cell 106*b***.

Figure 6:
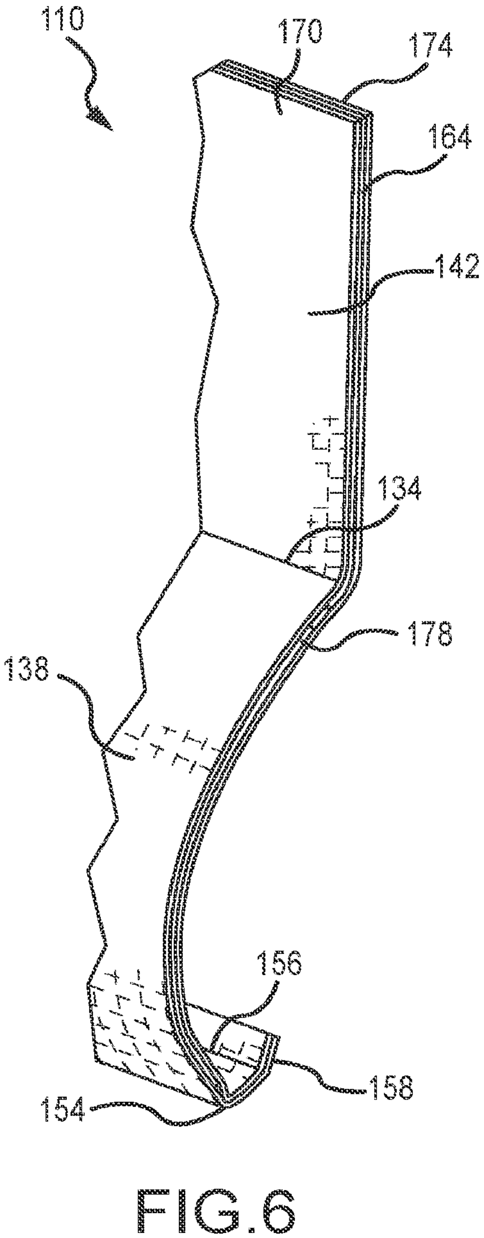
FIG. 6 is an enlarged isometric view of a strip of material of the covering of FIG. 1 in accordance with an embodiment of the present disclosure.

Referring to FIG. 6, an illustrative embodiment of strip of material 110 is depicted. The illustrative strip of material 110 may include multiple creases or fold lines to facilitate collapse and expansion of the cells during retraction and extension, respectively, of the panel 102. A first crease or fold line 134 (hereinafter "fold line" for the sake of convenience without intent to limit) may extend lengthwise along a length of the strip of material 110. The first fold line 134 may separate a curved or front wall portion 138 (hereinafter "curved portion" for the sake of convenience without intent to limit) from a substantially planar or rear wall portion 142 (hereinafter "substantially planar portion" for the sake of convenience without intent to limit) of the strip of material 110. The curved portion 138 may form a front wall of a cell (for example front wall **122*b* of second cell 106*b* in FIG. 3), and the substantially planar portion 142 may form a rear wall of an adjacent cell (for example rear wall 118*a* of first cell 106*a* in FIG. 3). The first fold line 134 may function as a living hinge permitting the curved portion 138 to pivot about the first fold line 134 relative to the substantially planar portion 142, thereby facilitating retraction and storage of the panel 102 (see FIG. 8**).

Referring to FIG. 3, the substantially planar portions 142 of adjacent strips of material 110 may be operably coupled together, thereby collectively forming a rear wall 146 of the panel 102 (see FIG. 8). As illustrated in FIG. 3, the substantially planar portion 142*b* of second strip of material 110*b* may overlap and be coupled to the substantially planar portion 142*a* of the first strip of material 110*a* along first coupling line 114*a*, and the substantially planar portion 142*c* of third strip of material 110*c* may overlap and be coupled to the substantially planar portion 142*b* of second strip of material 110*b* along third coupling line 114*c*, thereby forming a substantially planar rear wall 146 of the panel 102 (see FIG. 8). In the illustrative embodiment of FIG. 3, upper end portions of the substantially planar portions 142*b*, 142*c* of second and third strips of material 110*b*, 110*c* may overlap and be coupled to substantially planar portions 142*a*, 142*b* of first and second strips of material 110*a*, 110*b*, respectively, thereby forming stiffened regions adjacent first fold lines 134*a*, 134*b* of first and second strips of material 110*a*, 110*b*, respectively, which may facilitate pivoting of curved portions 138*a*, 138*b* about the first fold lines 134*a*, 134*b* relative to the substantially planar portions 142*a*, 142*b* of the first and second strips of material 110*a*, 110*b*, respectively, to collapse and expand cells 106*a*, 106*b*, respectively.

Referring to FIG. 6, a second crease or fold line 154 (hereinafter "fold line" for the sake of convenience without intent to limit) may extend lengthwise along a length of the strip of material 110. The second fold line 154 may separate the curved portion 138 from a tab 158 of the strip of material 110. A third crease or fold line 156 (hereinafter "fold line" for the sake of convenience without intent to limit) may extend lengthwise along a length of the strip of material 110. The third fold line 156 may be positioned between the second fold line 154 and the tab 158, and in some embodiments may be positioned immediately adjacent the tab 158. The tab 158 may form a portion of a bottom wall of a cell (for example bottom wall 126*a* of first cell 106*a* in FIG. 3). The second fold line 154 and the third fold line 156 may function as living hinges permitting the curved portion 138 to pivot about the second fold line 154 and the third fold line 156 relative to the tab 158, thereby facilitating retraction and storage of the panel 102 (see FIG. 8).

The tabs 158 of the strips of material 110 may be coupled to curved portions 138 of adjacent strips of material 110, thereby collectively forming a front wall 162 of the panel 102 (see FIG. 8). As illustrated in FIG. 3, the curved portion 138*a* of first strip of material 110*a* may overlap the curved portion 138*b* of second strip of material 110*b*, and the tab 158*a* of first strip of material 110*a* may be coupled to the curved portion 138*b* along second coupling line 114*b*. Similarly, the curved portion 138*b* of second strip of material 110*b* may overlap the curved portion 138*c* of third strip of material 110*c*, and the tab 158*b* of second strip of material 110*b* may be coupled to the curved portion 138*c* along fourth coupling line 114*d*. The tabs 158*a*, 158*b* may be folded upwardly relative to the curved portions 138*a*, 138*b* along second folds 154*a*, 154*b* and third folds 156*a*, 156*b* and may be coupled to outer surfaces of the curved portions 138*b*, 138*c*, respectively. The overlapped curved portions 138 of the strips of material 110 may form a cascading front wall 162 of the panel 102 (see FIG. 8).

Referring to FIG. 3, at least a portion of each curved portion 138 (for example curved portions 138*a*, 138*b*) may be visible from a front side of the panel 102 (see FIG. 8). At least these visible portions of the curved portions 138 may include an aesthetic surface treatment (for example a color, texture, or other surface treatment) to enhance the aesthetics of the panel 102. The curved portion 138 of the strip of material 110 may include a different surface treatment than the substantially planar portion 142. For example, in some embodiments the curved portion 138 of the strip of material 110 may be colored and/or textured (such as by dyeing, printing, or other surface treatment methods), thereby providing an aesthetic front wall 162 of the panel 102 (see FIG. 8) while reducing the cost of manufacturing the panel 102 by not applying the surface treatment to the entire strip of material 110 (e.g., to the substantially planar portion 142 of the strip of material 110). In some embodiments, a layer of light-blocking material (hereinafter "blackout material" for the sake of convenience without intent to limit) may be applied to the strips of material 110 to inhibit light from being transmitted through the panel 102. The blackout material may be applied to the curved portion 138, the substantially planar portion 142, or both. In some embodiments, the blackout material may be applied to a rear layer of the strips of material 110. In one example, as illustrated in FIGS. 3-6, a blackout material 164 may be applied to each strip of material 110. The blackout material 164 of the strips of material 110 collectively may extend the full extent of the panel 102, such that the blackout material 164 inhibits light from being transmitted through the panel 102 when the panel 102 is in a fully extended position. The blackout material 164 may be formed from various materials and thicknesses. In one example, the blackout material 164 may be formed of a non-woven film having light-blocking properties. The non-woven film may have a thickness that is less than about 5 mil. In one example, the film may have a thickness this is less than about 2 mil. In one example, the film may have a thickness that is greater than about one-half mil.

Figure 7:
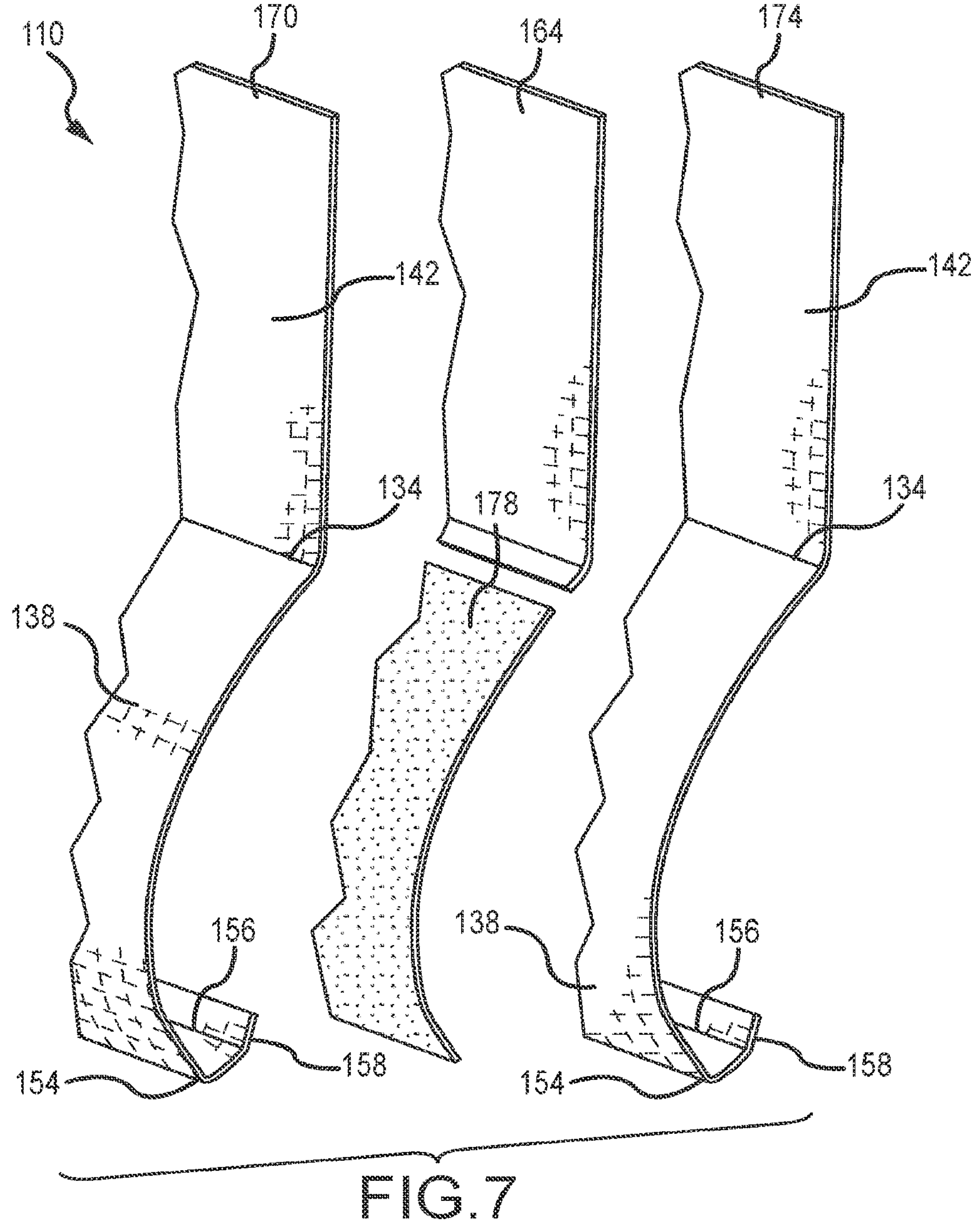
FIG. 7 is an exploded view of the strip of material illustrated in FIG. 6 in accordance with an embodiment of the present disclosure.

Referring to FIG. 7, each strip of material 110 may include multiple layers. For example, in the illustrative embodiment of FIG. 7, the strip of material 110 may include a front layer 170, a rear layer 174, and an intermediate layer or cell support member 178 (hereinafter "cell support member" for the sake of convenience without intent to limit). The front layer 170 and the rear layer 174 may include substantially the same profile as each other and as the strip of material 110. The front layer 170 and the rear layer 174 may be formed from a fabric material, such as a nonwoven fabric material. The front layer 170 and the rear layer 174 may be formed from the same material or different materials. In some embodiments, the front layer 170 and the rear layer 174 are formed from different nonwoven fabric materials. For example, the rear layer 174 may be formed from a less expensive material than the front layer 170 in examples where the rear layer 174 is not visible from a room side of the covering 100.

Referring to FIGS. 4-7, the blackout material 164 may extend along the front layer 170 and/or the rear layer 174 for a majority of the distance between the top of the front and rear layers 170, 174 and the first fold 134. As illustrated in FIG. 6 (with reference to FIGS. 3-5), the blackout material 164 may extend from aligned upper edges of the front and rear layers 170, 174 and may terminate adjacent the first fold 134. In the example illustrated in FIGS. 4 and 6, the blackout material 164 may extend beyond the first fold 134 and may terminate adjacent the cell support member 178. As illustrated in FIG. 3, the blackout material 164 of adjacent strips of material 110 may overlap one another along a vertical extent of the rear wall 146 of the panel 102 to inhibit light from being transmitted through the panel 102. In one example, the blackout material 164 extends past the first fold 134 by about one-eighth of an inch. As illustrated in FIGS. 6 and 7, the blackout material 164 may be positioned (e.g., sandwiched) between the front and rear layers 170, 174. In the example illustrated in FIGS. 6 and 7, the blackout material 164 may be spaced a distance from the cell support member 178 to provide a gap to account for manufacturing tolerance/variance of the dimensions of the blackout material 164 and the cell support member 178 to ensure the blackout material 164 and the cell support member 178 do not overlap, which overlap may cause an undesirable ripple or other surface irregularity visible from a front side of the panel 102. The blackout material 164 may be coupled with the front and rear layers 170, 174 by adhesive, heat sealant, or other techniques.

Referring to FIGS. 6 and 7, the cell support member 178 may be positioned (e.g., sandwiched) between the curved portions 138 of the front and rear layers 170, 174 and may extend along the front and rear layers 170, 174 for a majority of the distance between the first fold 134 and the second fold 154. As illustrated in FIG. 6 (with reference to FIG. 5), the cell support member 178 may extend from the second fold 154 to or beyond the coupling line 114*b* (see FIG. 5) and may terminate adjacent the first fold 134. In the illustrative embodiment of FIG. 5, the cell support member 178 of the strip of material 110*b* extends beyond the coupling line 114*b*, such that the cell support member 178 facilitates transfer of a biasing force from the superjacent strip of material 110*a* to the strip of material 110*b* to provide additional cantilever for the strip of material 110*b*. The cell support member 178 may terminate between the coupling line 114 and the first fold 134 (see, for example, coupling line 114*b* and first fold 134*b* in FIGS. 3 and 5). In some embodiments, the cell support member 178 may terminate a distance from the first fold 134. For example, the cell support member 178 may terminate less than about two inches from the first fold line 134. In some examples, the cell support member 178 may terminate less than about one inch from the first fold line 134. In some examples, the cell support member 178 may terminate about 0.375 inches from the first fold line 134, though other distances may be used depending on the particular application. The cell support member 178 may include substantially the same curvature as the curved portion 138 of the front and rear layers 170, 174. The cell support member 178 may stiffen and/or optionally import curvature to the curved portion 138 of the strip of material 110 and may be resilient to facilitate expansion of the respective cell of the panel 102 from a collapsed configuration. As illustrated in FIG. 7, third fold lines 156 may be formed between the second fold lines 154 and the tabs 158 in both the front and rear layers 170, 174. The third fold lines 156 may be spaced a distance apart from the second fold lines 154 and may define an inner edge of the tabs 158. The tabs 158 may be used to couple a respective strip of material 110 to a subjacent strip of material 110.

Referring to FIG. 3, each strip of material 110 may include a support member 178 that is resilient so as to allow the strips of material 110, and thus the cells 106, to at least partially collapse when the panel 102 is retracted, and spring or bias to an expanded configuration when the panel 102 is extended. A "collapsed" cell includes the configuration where the front and rear walls of a respective cell are positioned adjacent each other (e.g., in contact or in partial contact), and an "expanded" cell includes the configuration where the front and rear walls of a respective cell are spaced from each other to define an insulative air chamber or void between the front and rear walls.

The cell support member 178 may be a thermoformable material that becomes partially or substantially shapeable after heating, and retains its formed shape after cooling. The cell support member 178 may be a moldable film, such as polyester film, or other thermoformable material. The cell support member 178 may have an adhesive-like property when heated and then cooled. The cell support member 178 may be coupled to the front and rear layers 170, 174 by adhesion, stitching, ultrasonic welding, or other coupling techniques or methods. In some embodiments, the cell support member 178 may be adhered to the front and rear layers 170, 174 with an adhesive that sets at a temperature below the forming temperature of the cell support member 178, thereby permitting coupling of the cell support member 178 to the front and rear layers 170, 174 in a substantially planar configuration and subsequent thermoforming of the cell support member 178 to set a spiral curvature of the cell support member 178 and thus the curved portion 138 of the strip of material 110 (see FIGS. 6 and 7).

To set the spiral curvature of the cell support member 178, the strip of material 110 may be wound around a support tube, mandrel, or other forming member and then heated. As the components are heated, the cell support member 178 may be re-shaped to conform generally to the shape of the forming member. After cooling, the curved portion 138 of the strip of material 110 may have the shape of the cell support member 178. A method of manufacturing the panel 102 is described in more detail below.

Referring to FIG. 8, the covering 100 may include a head rail 184 and an end rail 186. A roller 188, such as a support tube, may be positioned in the head rail 184, and the panel 102 may be coupled to the roller 188 for retracting and extending the panel 102 across the architectural opening as the roller is rotated in a selected direction. The end rail 186 may be coupled to the panel 102 opposite the roller 188, and the weight of the end rail 186 may tension the panel 102 when extended to help expand the strips of material 110, and thus the cells 106, from a collapsed configuration to an expanded configuration.

As shown in the illustrative embodiment of FIG. 8, the panel 102 may be wound around the roller 188. As the panel 102 is wound around the roller 188, the effective length of the panel 102 decreases and the end rail 186 is moved towards the head rail 184. The head rail 184 may be dimensioned to house or receive substantially the entire panel 102 wound around the roller 188, such that the panel 102 may be substantially hidden from view within the head rail 184, which may provide protection from ultra-violet sunlight damage, dust, and other environmental factors. The end rail 186 may be received through an opening in an underside of the head rail 184, or may abut against the underside of the head rail 184 when the panel 102 is in a fully retracted position.

During retraction of the panel 102, the strips of material 110 may collapse to decrease the volume of the cells 106, thereby decreasing a depth distance between overlapped portions of adjacent strips of material to facilitate storage of the panel 102 along a side of the architectural opening, such as wrapped around the roller 188 within the head rail 184. The strips of material 110 may collapse when wound around the roller 188 because, for example, the first and second folds 134, 154 of the strips of material 110 (see FIG. 7) may allow the strips of material 110 to deform into a wound configuration having a curvature that generally corresponds to the curvature of the cell support members 178, which may be substantially equal to a curvature of the roller 188. During collapse of the strips of material 110, the substantially planar portions 142 of the strips of material 110 may conform to the curved portion 138 of adjacent strips of material 110, and as previously discussed the curved portion 138 may have a curvature that generally corresponds to the curvature of the cell support member 178.

During extension of the panel 102, the strips of material 110 may expand to increase the volume of the cells 106, thereby increasing the air trapped between adjacent strips of material 110 to increase the insulative factor of the panel 102. The panel 102 may be configured so that each strip of material 110 within the panel 102 may be biased to expand as the panel 102 is extended to ensure each cell 106 fully expands during extension to increase the insulative factor of the panel 102 and provide a uniform appearance along the length of the panel 102. For example, as the panel 102 is unwound from the roller 188, the cell support member 178 of each strip of material 110 may bias the cells 106 toward an expanded configuration. The cell support members 178 and the first and second folds 134, 154 of the strips of material 110 (see FIG. 7) may apply tension to the substantially planar portions 142 of the strips of material 110 to remove slack in the substantially planar portions 142, thereby moving the substantially planar portions 142 away from corresponding curved portions 138 of respective cells 106 to expand the strips of material 110 and increase the insulative factor of the panel 102.

Figure 9:
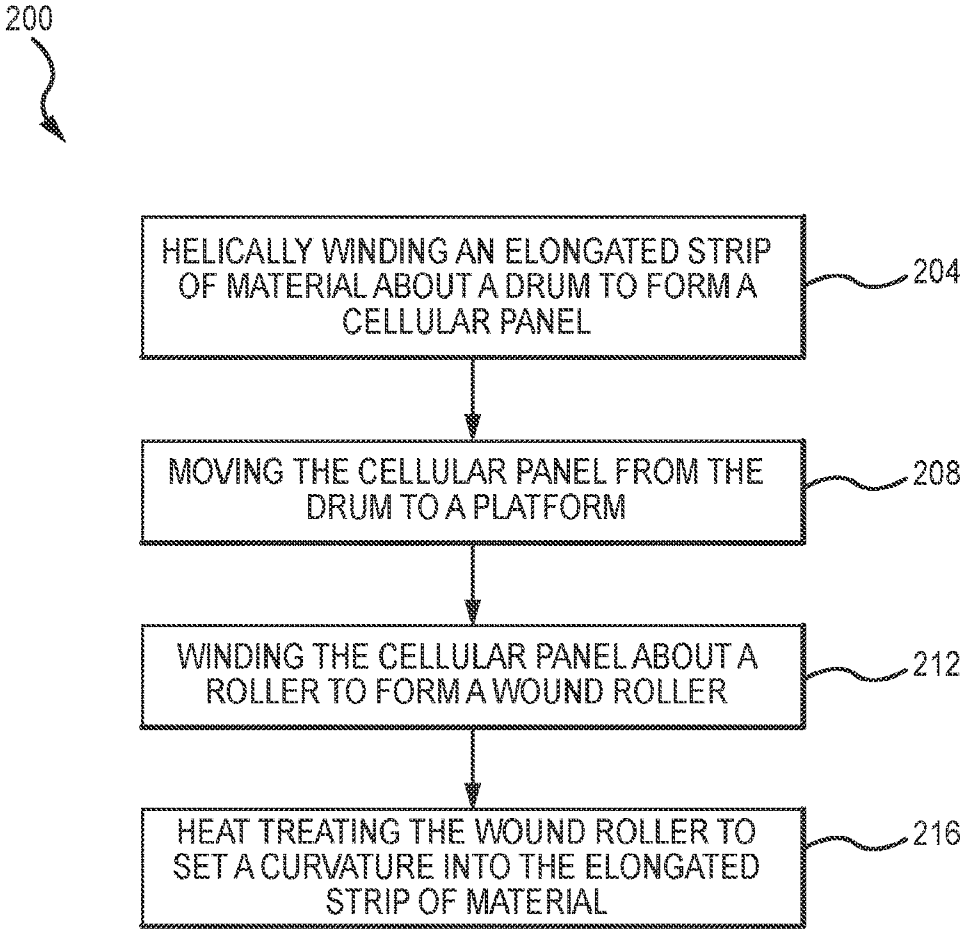
FIG. 9 is a flowchart of a method of manufacturing the covering of FIGS. 1-8 in accordance with an embodiment of the present disclosure.

Referring to FIG. 9, a method 200 of manufacturing an architectural covering is illustrated. The method 200 may include helically winding an elongated strip of material about a drum to form a panel (operation 204). The method 200 may include moving the panel from the drum to a platform (operation 208). The method 200 may include winding the panel about a roller to form a wound roller (operation 212). The method 200 may include heat treating the wound roller to set a spiral curvature into the elongated strip of material (operation 216). The method 200 may be synchronized, so that a first-formed covering product may be moved from the platform to a heat treating device, substantially when a second-formed covering product is moved from the drum to the platform.

Figure 10:
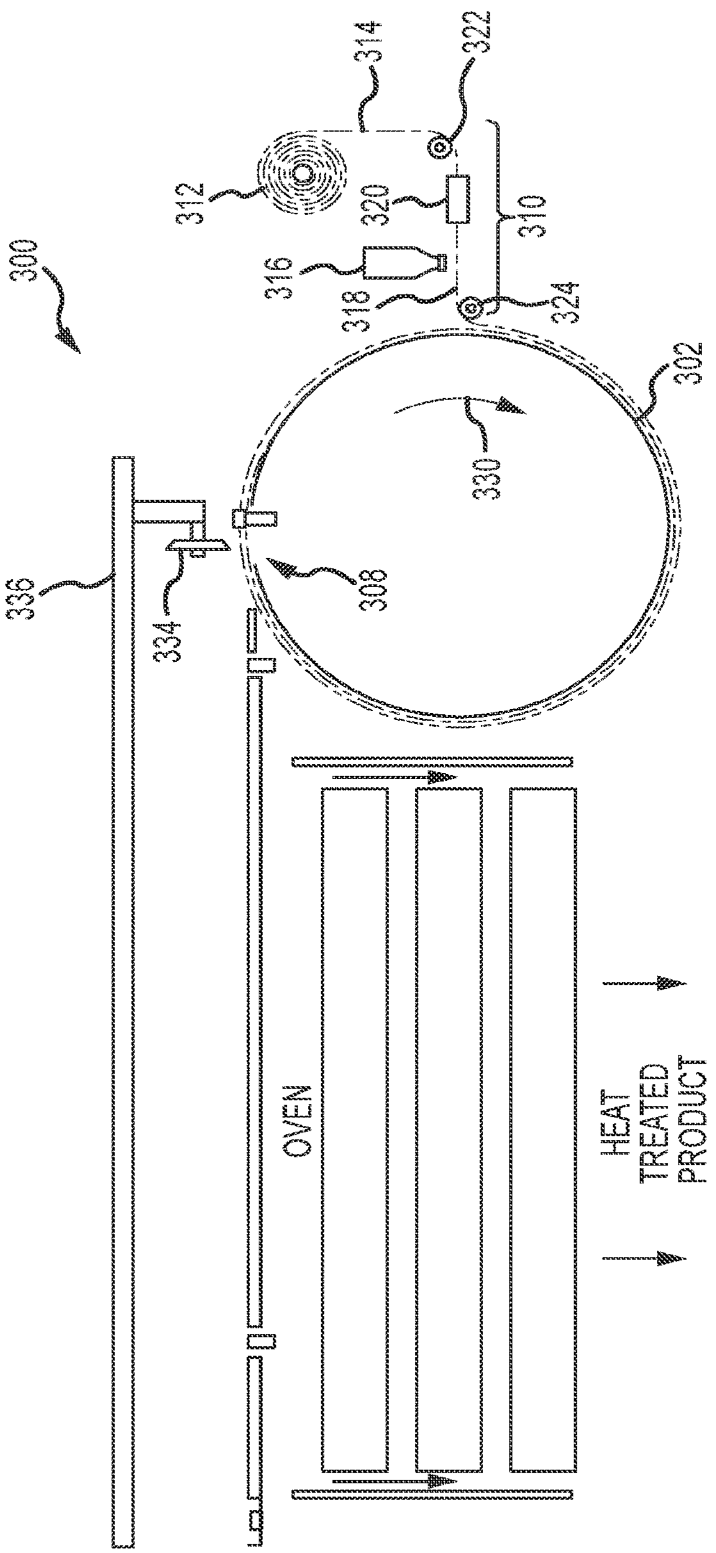
FIG. 10 is an elevational view of a system for manufacturing the covering of FIGS. 1-8 illustrating a drum winding operation in accordance with an embodiment of the present disclosure.
Figure 11:
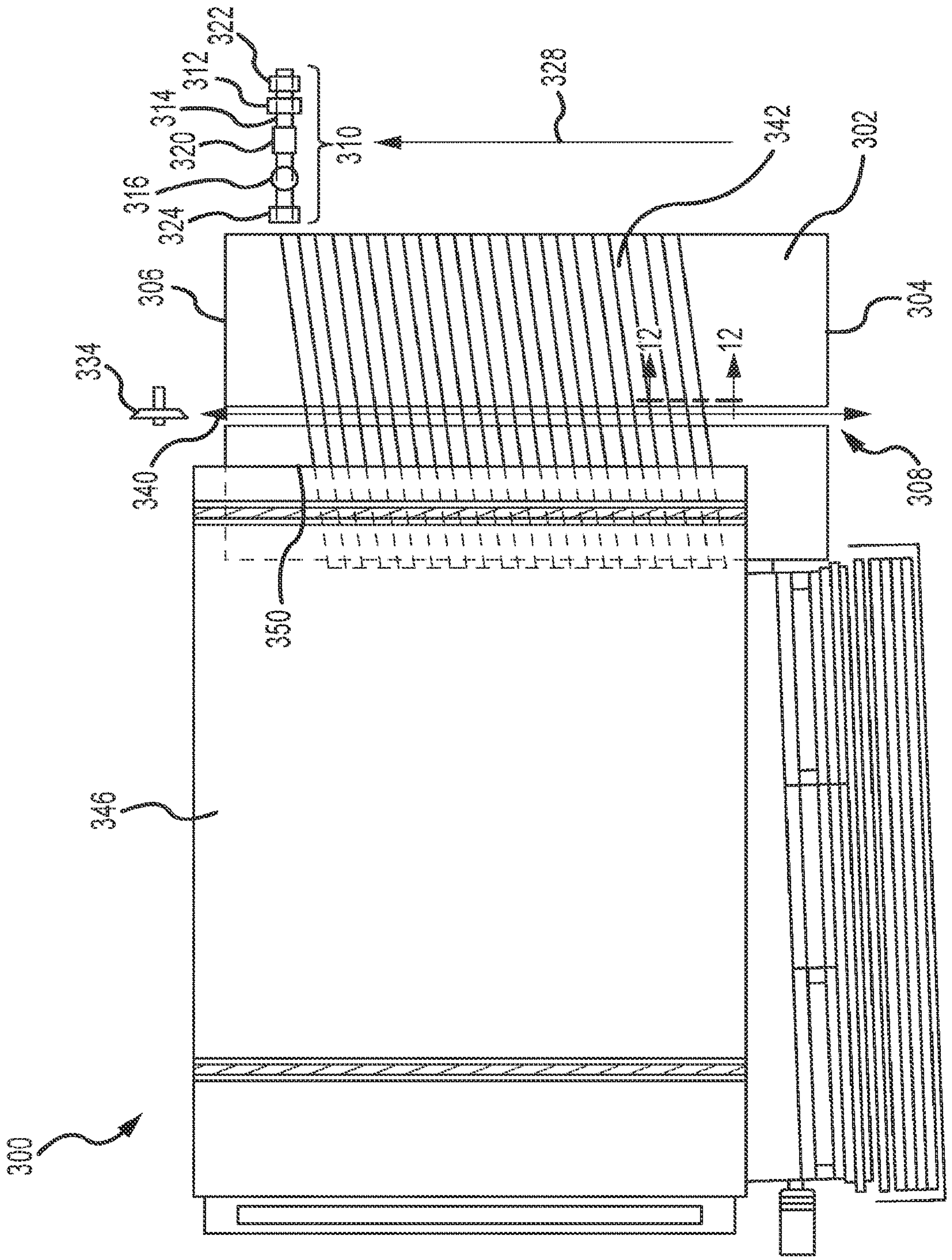
FIG. 11 is a top plan view of the system of FIG. 10 in accordance with an embodiment of the present disclosure.

Turning now to FIGS. 10 and 11, a system 300 capable of performing operation 204 of FIG. 9 is illustrated. As illustrated in FIGS. 10 and 11, system 300 may include a drum 302 that is rotatable about its center axis such as by suitable automated machinery. The drum 302 may have axial front and rear ends 304, 306 (see FIG. 11). The drum 302 may include an opening or groove 308 (hereinafter "groove" for the sake of convenience without intent to limit), which may extend the axial length of the drum 302 defined between the front and rear ends 304, 306. The drum 302, which may be formed as a shell, may have a circumference defining a width dimension of a wound panel, which subsequently may be subdivided into smaller width panels. In some embodiments, the circumference of the drum 302 may be about sixteen feet. The axial length of the drum 302 may define a length of the wound panel, which subsequently may be subdivided into smaller length panels.

Figure 16:
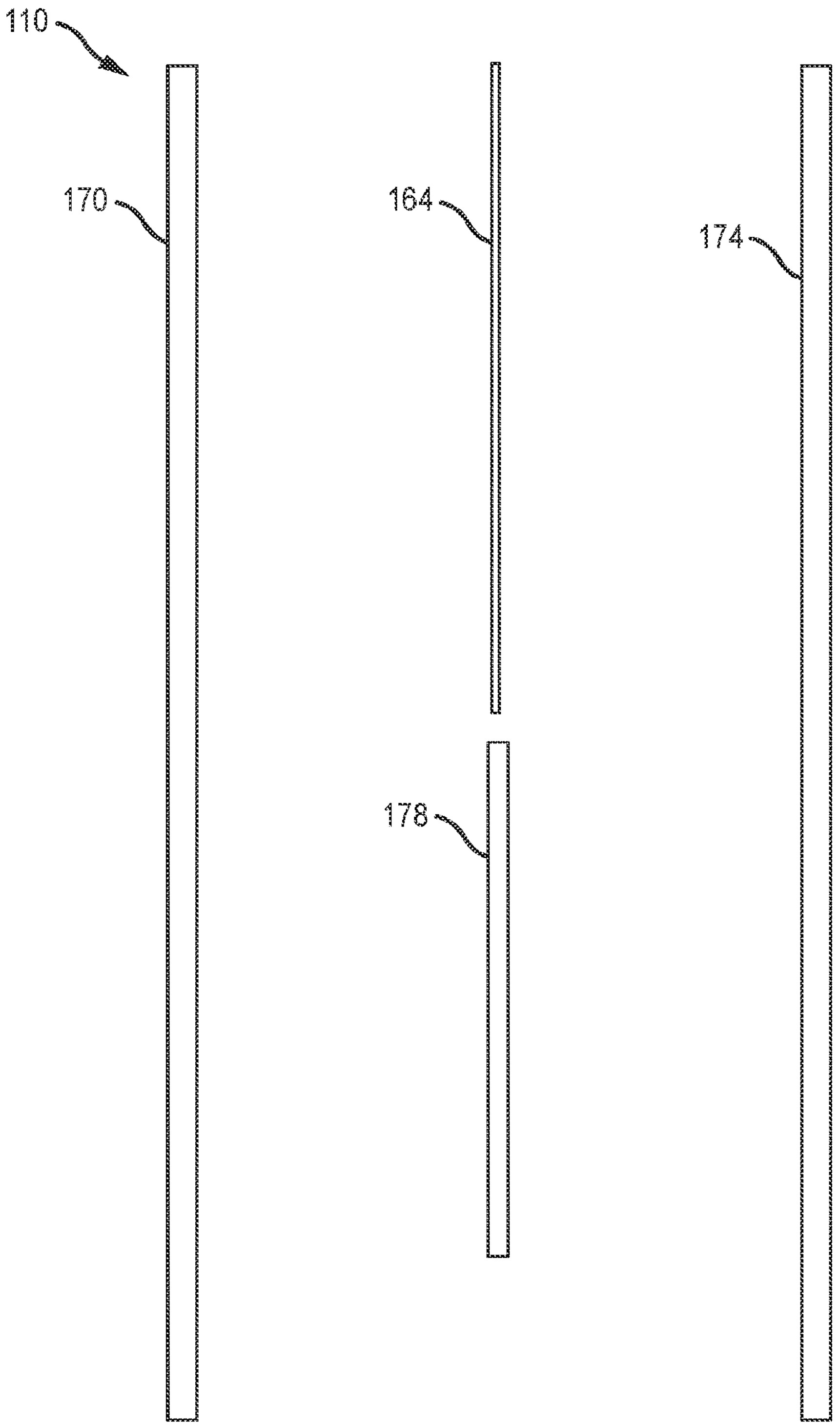
FIG. 16 is an exploded view of the strip of material illustrated in FIG. 6 in accordance with an embodiment of the present disclosure.

Referring still to FIGS. 10 and 11, the system 300 may include a distributing structure 310 for distributing material against an outer surface of the drum 302. The distributing structure 310 may include a supply roll 312 of an elongated strip of material 314 (such as strip of material 110 in FIG. 6 in a pre-folded/molded configuration as illustrated in exploded form in FIG. 16) for winding around the drum 302. The distributing structure 310 may include an adhesive dispenser 316 for applying adhesive 318 to the elongated strip of material 314 prior to the elongated strip of material 314 being wound around the drum 302. The adhesive dispenser 316 may apply multiple lines of adhesive 318 (such as coupling lines **114*a* and 114*b* in FIG. 3) to the elongated strip of material 314, and the lines of adhesive 318 may be spaced apart from each other along a width of the strip of material 314. The lines of adhesive 318 may be applied adjacent first and second folds of the strip of material 314 (such as first and second folds 134, 154 of the strip of material 110 in FIG. 3). The lines of adhesive 318 may adhere adjacent layers or windings (hereinafter "layers" for the sake of convenience without intent to limit) of the strip of material 314 to one another to define cells (such as cells 106 in FIG. 3**) therebetween.

The distributing structure 310 may include a folding structure 320 for folding the strip of material 314 (for example, for folding the tab 158 along fold line 154 of the strip of material 110 in FIG. 3) such that adhesive may be applied to the tab 158. The folding structure 320 may be formed as an open-ended box with an inlet having a larger width dimension than an outlet of the box such that the strip of material 314 enters the inlet of the box and at least one of the side walls of the box tapers inwardly from the inlet to the outlet of the box to fold the strip of material 314 along its width (such as folding the tab 158 along fold line 154 of the strip of material 110 in FIG. 3). The distributing structure 310 may include one or more guide rollers 322, 324 for guiding the strip of material 314 from the supply roll 312 through the folding structure 320 to the adhesive dispenser 316 and onto the drum 302.

Figure 12:
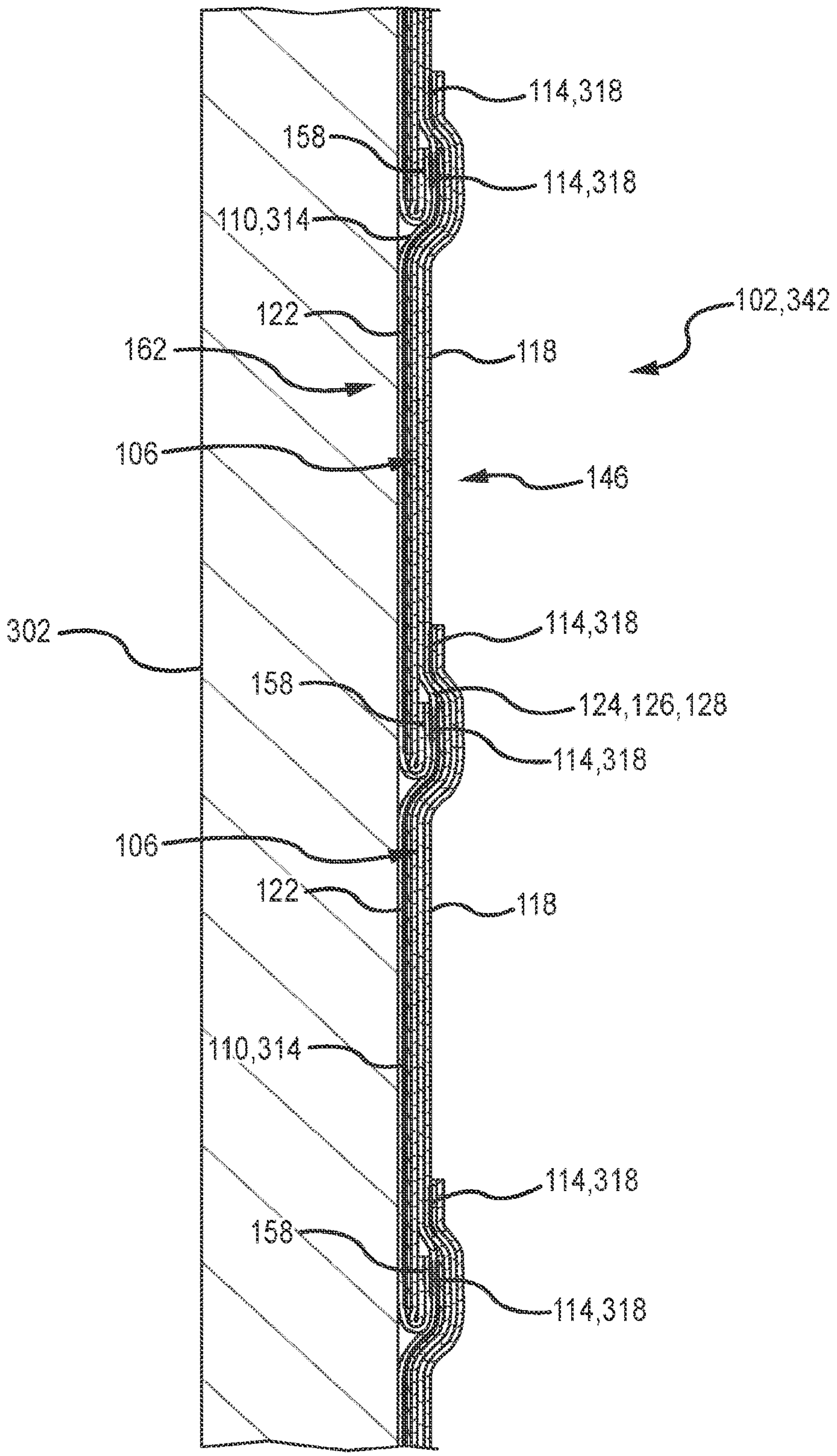
FIG. 12 is a longitudinal cross-sectional view of a panel of the covering of FIG. 1 taken along line 12-12 of FIG. 11 in accordance with an embodiment of the present disclosure.

The strip of material 314 may be helically wound around the drum 302 such that each winding of the strip of material 314 about the drum 302 may form a strip of material 110 of the panel 102 of FIG. 1. As illustrated in FIG. 12, the panel 342 may be relatively flat when wound around the drum 302 and may form the panel 102 of FIG. 1 after subsequent operations discussed below. A front wall 162 of panel 102 may face inwardly toward the drum 302, and a rear wall 146 of panel 102 may face outwardly away from the drum 302. The strips of material 110 may be oriented such that front walls 122 of cells 106 may be wound against the drum 302 and rear walls 118 may face outwardly away from the drum 302. The tabs 158 of strips of material 110 may be folded over by the folding structure 320 (see FIG. 10) such that the tabs 158 may face outwardly away from the drum 302. The lines of adhesive 318 applied by the adhesive dispenser 316 (see FIG. 10) may form coupling lines 114 for coupling overlapped strips of material 110, and the lines of adhesive 318 may face outwardly away from the drum 302 for coupling to an adjacent, overlapped winding of the strip of material 314. In some embodiments, front wall 162 of the panel 102 may face outwardly away from the drum 302, and rear wall 146 of the panel 102 may face inwardly toward the drum 302.

Referring to FIG. 11, the distributing structure 310 may move axially along a side of the drum 302 during winding of the strip of material 314 around the drum 302. The distributing structure 310 may be initially positioned near the axial front end 304 of the drum 302 and may move in an axial direction 328 toward the rear end 306 of the drum 302 during the winding process. As illustrated in FIG. 10, when winding the strip of material 314 about the drum 302, the drum 302 may spin in a clockwise direction 330. The distributing structure 310 may automatically travel towards the axial rear end 306 of the drum 302 during rotation of the drum 302, resulting in the strip of material 314 being helically wound around the drum 302. The rate of axial advancement of the distributing structure 310 may be based on the desired overlap of adjacent strips of material 110 on the panel 102 (see FIGS. 2 and 3). A faster rate of axial advancement may reduce the overlap resulting in a smaller cell size (e.g., reduced cell height and/or depth) and a slower rate of axial advancement may increase the overlap resulting in a larger cell size (e.g., increased cell height and/or depth). Adjustment of the rate of axial advancement of the distributing structure 310 may be automated by computer-based controls. The distributing structure 310 may be capable of translating in either axial direction between the front end 304 and the rear end 306 of the drum 302.

Referring to FIG. 10, the winding process may wrap the strip of material 314 continuously around the drum 302 such that the strip of material 314 extends across the axial groove 308 in the drum 302. As illustrated in FIGS. 10 and 11, a cutter 334, such as a rotary cutting wheel, may be supported on a gantry system 336, for example. Once a desired amount of strip of material 314 is wound about the drum 102, the drum 102 may be rotated to align the axial groove 308 with the cutter 334, such as positioning the axial groove 308 along a top of the drum 302. Once aligned, the cutter 334 may extend within the groove 308 and travel axially along the drum 102 between the opposing front and rear ends 304, 306 of the drum 302 (see arrow 340 in FIG. 11) to cut the wound strip of material 314 and form a panel 342 with side edges (see, e.g., panel 102 in FIG. 1). One of the edges of the panel 342 may be held against the drum 102 along one side of the axial groove 308 by one or more magnets, for example.

Figure 13:
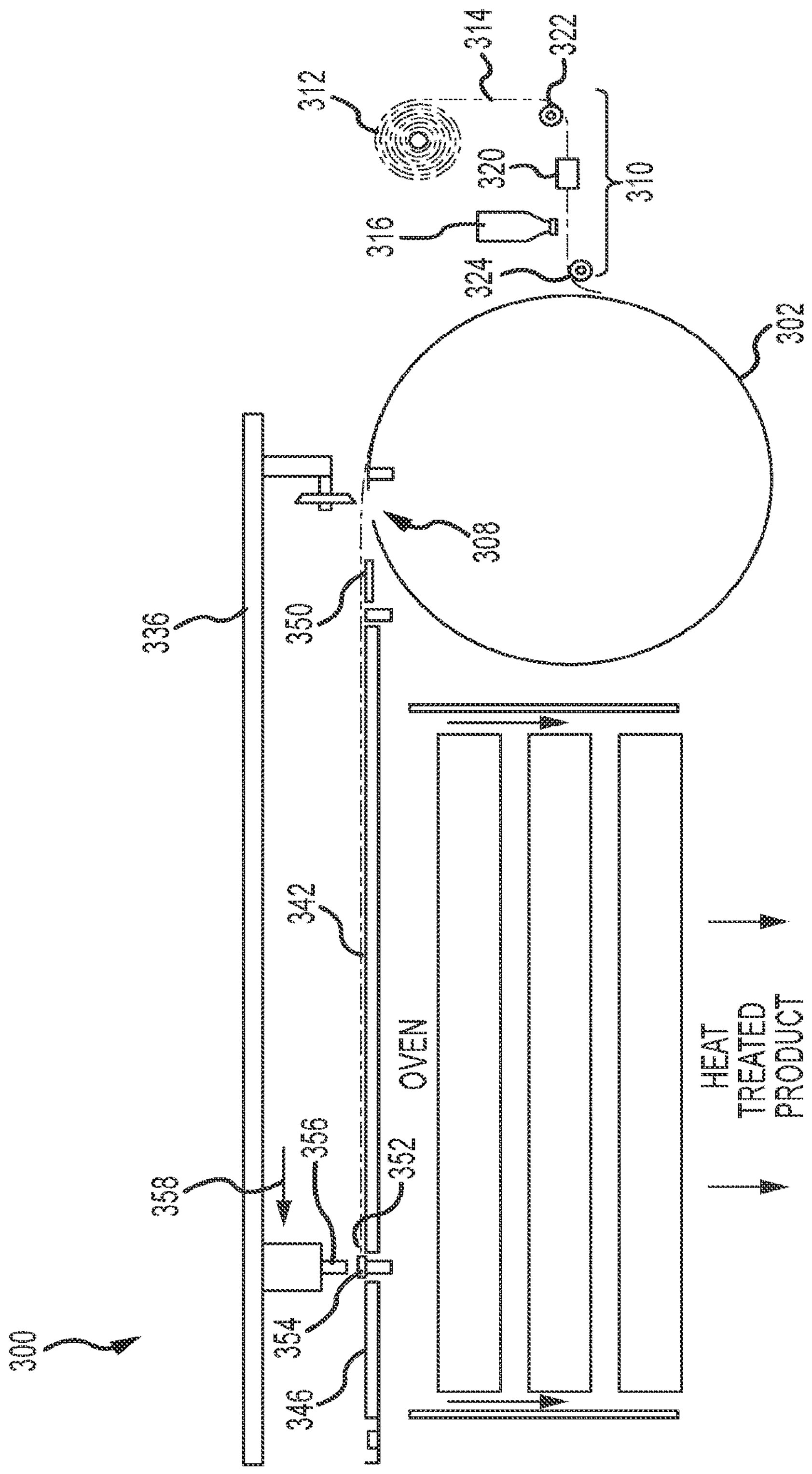
FIG. 13 is an elevational view of the system of FIG. 10 illustrating a moving operation in accordance with an embodiment of the present disclosure.

As illustrated in FIGS. 11 and 13, the platform 346 may take the form of a table or workbench, which may have a rectangular working surface sufficiently large to support the panel 342. A right side edge 350 of the platform 346 may be disposed above a portion of a left side of the drum 302 adjacent to the axial groove 308 in the drum 302. The positional relationship between the platform 346 and the drum 302 may facilitate an efficient transfer of the panel 342 from the drum 302 onto the platform 346. If a front wall of the panel 342 is wound against the drum 302 during the drum winding process, then the panel 342 may be transferred directly to the platform 346 without flipping over the panel 342, thereby facilitating an efficient transfer of the panel 342 from the drum 302 onto the platform 346.

Referring to FIG. 13, the system 300 may move the panel 342 from the drum 102 to a platform 346. For example, the system 300 may grip a side edge of the panel 342 formed by the cutter 334 and may move the gripped edge lateral to the axis of the drum 302 to unwind the panel 342 from the drum 302. As illustrated in FIG. 13, a leading edge 352 of the panel 342 may be sandwiched by a metallic bar 354, and a magnet 356 (including magnetic or ferrous materials) coupled to the gantry system 336 may magnetically interact with the metallic bar 354 to thereby grip the leading edge 352 of the panel 342. The gantry system 336 may be configured to move the magnet 356, and thus the metallic bar 354 and the leading edge 352 of the panel 342, lateral to the axis of the drum 302 across the platform 346 (see arrow 358 in FIG. 12) to unwrap the panel 342 from the drum 302. Once the panel 342 is fully supported by the platform 346, the gantry system 336 may be configured to release the magnetic interaction between the magnet 356 and the metallic bar 354, thereby releasing the leading edge 352 of the panel 342. Depending on its desired dimensions, the panel 342 may be trimmed along its edges once positioned on the platform 346. The trimming operation may ensure the panel 342 is rectangular. The trimming operation may be performed by a manual or automated cutter (not illustrated).

Referring to FIG. 13, the system 300 may wind the panel 342 about a roller (such as roller 188 in FIG. 8) to form a wound roller. As illustrated in FIG. 13, the system 300 may include a supply of rollers 360. The system 300 may obtain a roller 362 from the supply 360 and position the roller 362 against a top edge portion 364 of the rear surface 366 of the panel 342. To create the proper alignment between the roller 362 and the panel 342, the roller 362 may be positioned at an angle equivalent to an angular offset at which the elongated strip of material 314 is helically wound about the drum 302. Alternatively, the panel 342 may be re-oriented on the platform 346 by the gantry system 336, for example, such that the panel 342 is square to the platform 346, and thus the roller 362 may be positioned substantially parallel to a front edge of the platform 346 and the top edge portion 364 of the panel 342. The trimming operation previously discussed may ensure the strips of material of the panel 342 extend substantially perpendicular to the side edges of the panel 342. The roller 362 may be coupled to the top edge portion 364 of the panel 342 by pre-coating the roller 362 with double sided tape (not illustrated) or applying a layer of double sided tape to the top edge portion 364 of the panel 342, for example.

Figure 14:
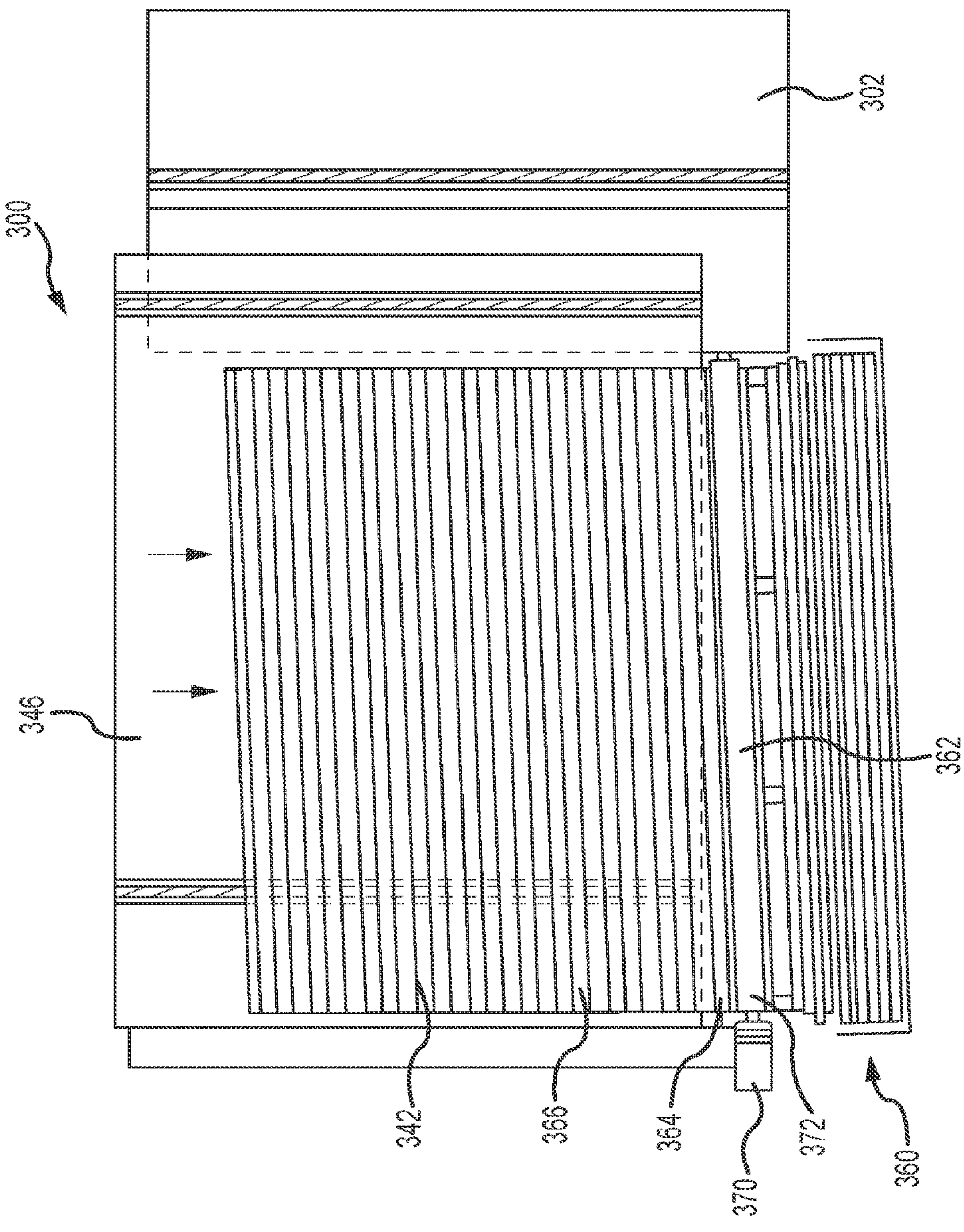
FIG. 14 is a top plan view of the system of FIG. 10 illustrating a roller winding operation in accordance with an embodiment of the present disclosure.

As illustrated in FIG. 14, a roller motor 370 may engage an end 372 of the roller 362. The roller motor 370 may turn the roller 362, thereby wrapping the panel 342 about the roller 362 to provide a curvature on each strip of material 110 (see FIG. 6), which may be defined by a segment of the spiral curve on which the cell support member 178 (see FIG. 6) is positioned when the panel 342 is wound about the roller 362. When wound around the roller 362, the panel 342 may be encapsulated, such as by a sheet of material 374 (see FIG. 15), to keep the panel 342 tightly wound about the roller 362 during subsequent processing, such as cutting in a rotary cutting process, storage, or other processing. The sheet of material 374 (hereinafter "tail paper" for the sake of convenience without intent to limit) may be dimensioned to wrap around the full circumference of the panel 342 that is wound about the roller 362 to protect the panel 342 from damage, such as from dirt or other debris. In some embodiments, the tail paper 374 may be dimensioned such that it may wrap around the full circumference of the panel 342 at least one time, such as about 1.25 to 1.33 times, or other numbers of times depending on the particular application. An upper edge portion of the tail paper 374 may be coupled to a bottom edge portion of the panel 342 (coupling not shown in FIG. 15) in various manners, such as via a strip of pressure sensitive tape. A lower edge portion of the tail paper 374 may be coupled to a previous winding of the tail paper 374 and may include an alternating assembly of tear strips and pressure sensitive tape to permit coupling of the tail paper 374, later inspection of the panel 342, and subsequent re-coupling of the tail paper 374. For example, the lower edge portion of the tail paper 374 may include a first tear strip, a first pressure sensitive tape, a second tear strip, and a second pressure sensitive tape spaced along the lower edge portion of the tail paper 374. The alternating arrangement may allow an operator to couple the lower edge portion of the tail paper 374 to a previous winding of the tail paper 374 along a lowermost-arranged pressure sensitive tape, and subsequently open the tail paper 374 for inspecting the panel 342 by pulling on an adjacent tear strip. After inspection, the operator may remove a release film from an adjacent pressure sensitive tape and re-roll the panel 342 about the roller 362, thereby encapsulating the tail paper 374 around the panel 342 and securing it in place via the adjacent pressure sensitive tape. The wound roller may be packaged tightly for storage, cutting, or other processing. The tail paper 374 may be formed from various materials and may include branding information (which may be printed on the tail paper) to facilitate identification of the type of panel, for example. The tail paper 374 may include a scale (which may be printed on the tail paper) extending along a length dimension of the roller 362. The scale may facilitate cutting the panel 342 to a desired width. The scale may facilitate quick identification of the width of a wound panel 342, such as when an operator is looking for a wound panel including a desired width amongst a stock of stored wound panels.

Figure 15:
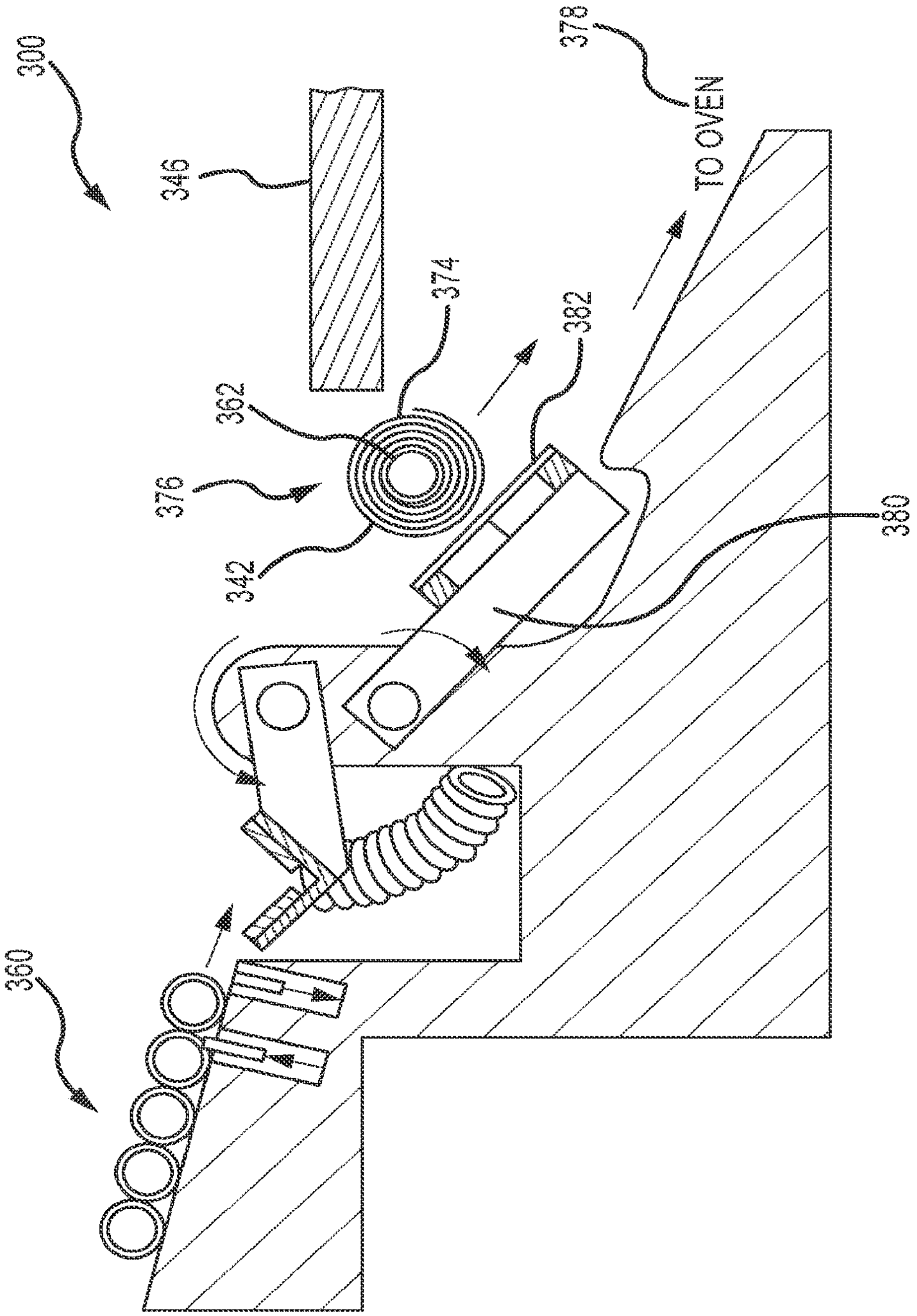
FIG. 15 is an elevational view of the system of FIG. 10 illustrating a wound roller ready for heat treatment in accordance with an embodiment of the present disclosure.

Referring to FIG. 15, the system 300 may apply heat to the wound roller 376 to set a curvature into respective cells of the panel 342 (such as by thermoforming the cell support member 178 to set the curvature of the curved portion 138 of the strip of material 110 in FIG. 6). A heat treating device, such as an oven 378, may be positioned under the platform 346 and an inlet to the oven 378 may be positioned near the area for winding the panel 342 around the roller 362 such that the wound roller 376 may be automatically fed into the inlet of the oven 378. The system 300 may include a pivot arm 380 configured to pivot a section 382 of the platform 346 in a downward direction, as illustrated in FIG. 15, and allow gravity to feed the wound roller 376 into an inlet of the oven 378. In the oven 378, the wound roller 376 may be heat treated so that the spiral curvature in each cell support member 178 (see FIG. 6) is permanently set. For example, the cell support member 178 may be formed from material that is thermoformable above about 170 degrees F. and/or below about 250 degrees F. In this example, the oven 378 may heat the wound roller 376 above about 170 degrees F. and/or below about 250 degrees F. to set a spiral curvature profile into the cell support members 178 (see FIG. 6). The oven 378 may be a standard convective type or a different type of oven which is capable of activating the thermoformable properties within the cell support members 178 (see FIG. 6). As the heat treatment process may be substantially longer than the time to form a wound roller 376, the oven 378 may be sufficiently large to hold multiple wound rollers so that the system 300 may continuously heat treat the wound rollers. A system similar to system 300 is described in U.S. Patent Publication Number 2013/0105094 to Colson et al., entitled "Process and System for Manufacturing a Roller Blind", which publication is incorporated herein by reference in its entirety.

Figure 17:
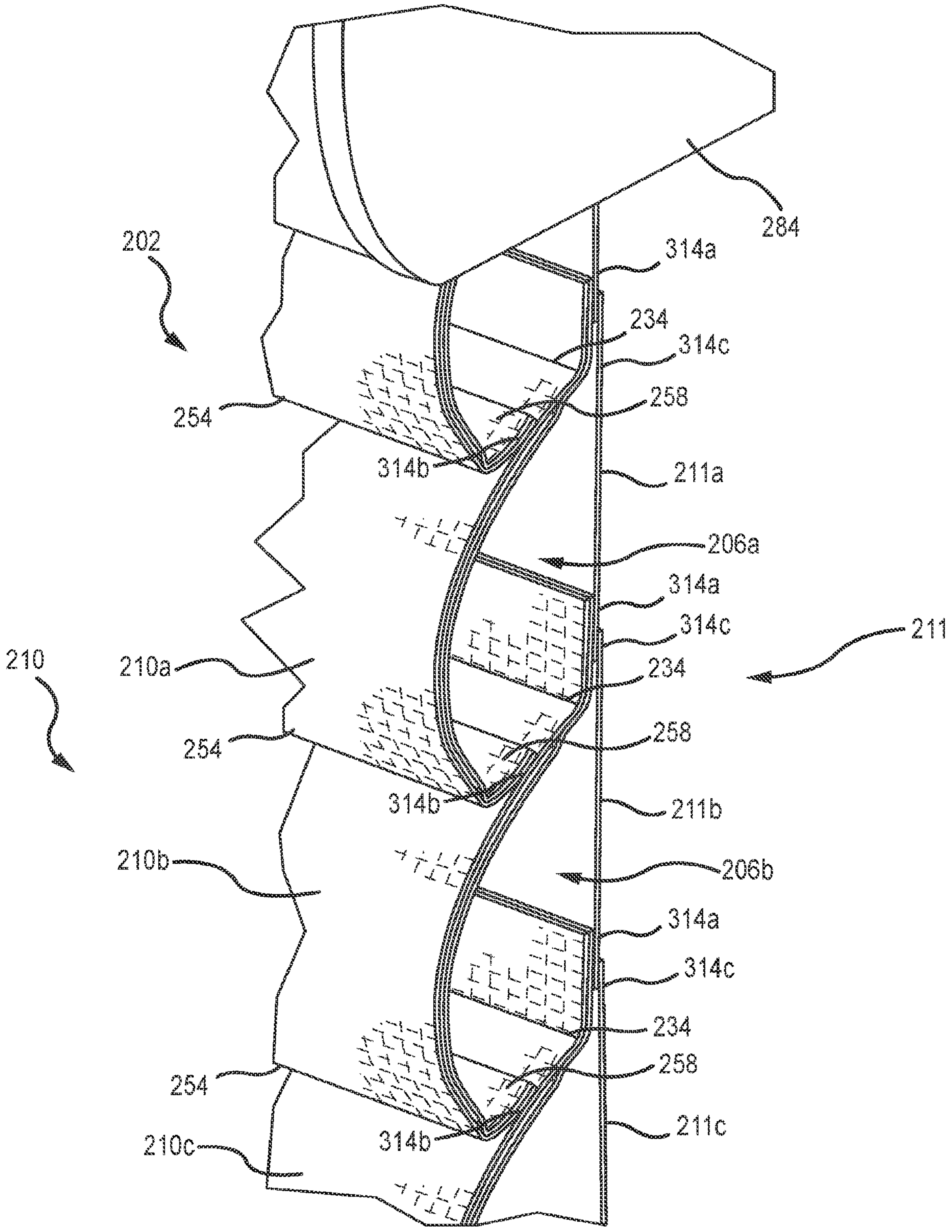
FIG. 17 is a fragmentary, enlarged isometric view of the covering of FIG. 1 in accordance with an embodiment of the present disclosure.

Referring to the illustrative embodiment of FIG. 17, the panel may optionally be manufactured with a separate support sheet formed from multiple strips of material. In the following description, elements or components similar to those in the embodiment of FIGS. 1-8 are designated with the same reference numbers increased by 100 and redundant description is omitted. As illustrated in FIG. 17, the panel 202 may include a first set of overlapping strips of material 210 forming a front sheet or wall of the panel 202 and a second set of overlapping strips of material 211 forming a rear sheet or wall of the panel 202. In the illustrative embodiment of FIG. 17, first, second, and third elongated overlapping strips of material 210*a*, 210*b*, 210*c* may be coupled together along tabs 258 via, for example, adhesive, stitching, or other techniques to form a portion of the front wall of the panel 202. First, second, and third elongated overlapping strips of material 211*a*, 211*b*, 211*c* may be coupled together along their overlaps via, for example, adhesive, stitching, or other techniques to form a corresponding portion of the rear wall of the panel 202. The first and second sets of overlapping strips of material 210, 211 may be coupled together along the strips of material 210 above the fold lines 234 via, for example, adhesive, stitching, or other techniques, to forms cells 206 between the first and second sets of overlapping strips of material 210, 211. In the illustrative embodiment of FIG. 17, first strips of material 210*a*, 211*a* may define an illustrative first cell 206*a* therebetween, and second strips of material 210*b*, 211*b* may define an illustrative second cell 206*b* therebetween. A panel similar to panel 202 is described in U.S. Patent Publication Number 2014/0053989 to Colson et al., entitled "Covering for Architectural Opening including Cell Structures Biased to Open", which publication is incorporated herein by reference in its entirety.

Figure 18:
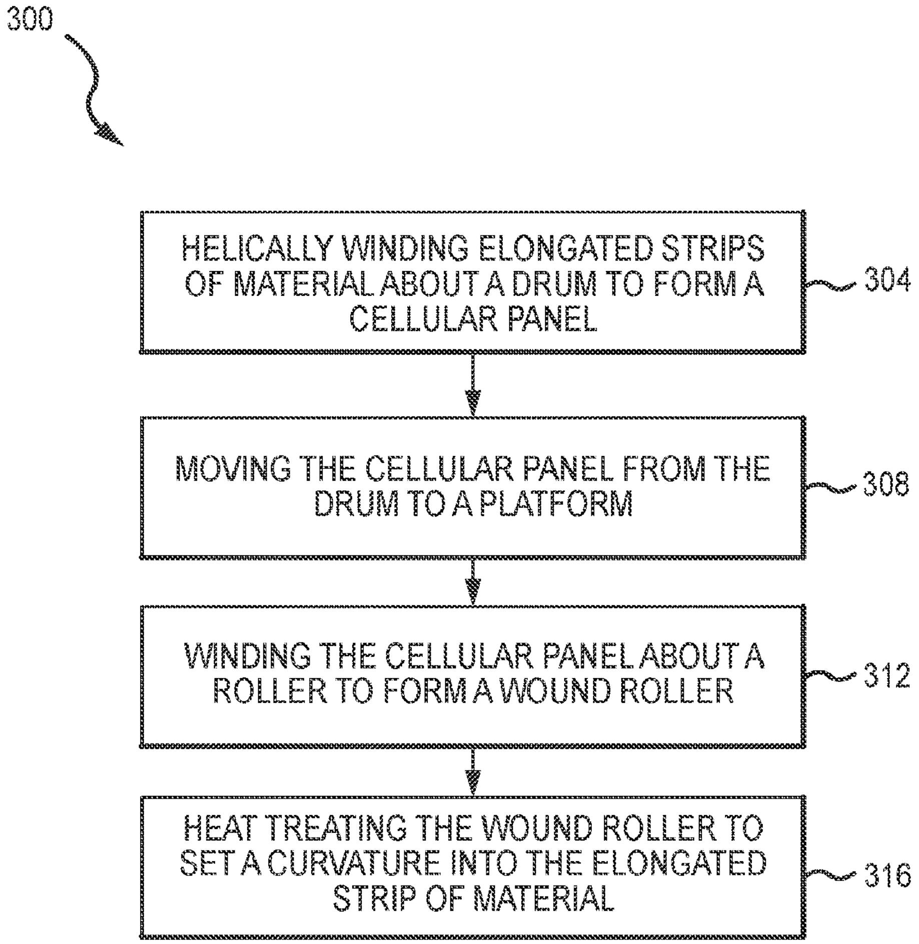
FIG. 18 is a flowchart of a method of manufacturing the covering of FIG. 17 in accordance with an embodiment of the present disclosure.

Referring to FIG. 18, a method 300 of manufacturing an architectural covering is illustrated. In the following description, elements or components similar to those in the embodiment of FIGS. 9-15 are designated with the same reference numbers increased by 100 and redundant description is omitted. The method 300 may include helically winding multiple elongated strips of material about a drum to form a panel (operation 304). The method 300 may include moving the panel from the drum to a platform (operation 308). The method 300 may include winding the panel about a roller to form a wound roller (operation 312). The method 300 may include heat treating the wound roller to set a spiral curvature into the elongated strip of material (operation 316). The method 300 may be synchronized, so that a first-formed covering product may be moved from the platform to a heat treating device, substantially when a second-formed covering product is moved from the drum to the platform.

Operation 304 of FIG. 18 may be performed by system 300 illustrated in FIGS. 10 and 11, which operates as previously described in relation to operation 204 of FIG. 9, except the distributing structure 310 distributes first and second elongated strips of material (such as strips of material 210, 211 in FIG. 17) in subsequent passes along a length of the drum 302. The supply roll 312 of the distributing structure 310 may include an elongated strip of material 314 (initially, e.g., strip of material 210 in FIG. 17) for winding first around the drum 302. The adhesive dispenser 316 of the distributing structure 310 may apply adhesive 318 to the strip of material 210 (see FIG. 17) prior to the strip of material 210 being wound around the drum 302. The adhesive dispenser 316 may apply multiple lines of adhesive 318 (such as coupling lines 314*a* and 314*b* in FIG. 17) to the strip of material 210 (see FIG. 17), and the lines of adhesive 318 may be spaced apart from each other along a width of the strip of material 210. The lines of adhesive 318 may be applied adjacent first and second folds of the strip of material 210 (such as first and second folds 234, 254 in FIG. 17). One of the lines of adhesive 318 (such as coupling line 314*b* in FIG. 17) may adhere adjacent layers or windings (hereinafter "layers" for the sake of convenience without intent to limit) of the strip of material 210 (see FIG. 17) to one another to define a panel wall (such as front wall 210 of panel 202 in FIG. 17).

Referring to FIG. 11, the distributing structure 310 may move axially along a side of the drum 302 during winding of the strip of material 314 (e.g., strip of material 210 in FIG. 17) around the drum 302, resulting in the strip of material 210 being helically wound around the drum 302. The rate of axial advancement of the distributing structure 310 may be based on the desired overlap of adjacent strips of material 210 on the panel 202 (see FIG. 17). The distributing structure 310 may be capable of translating in either axial direction between the front end 304 and the rear end 306 of the drum 302.

Referring to FIGS. 10 and 11, after the strip of material 314 (e.g., strip of material 210 in FIG. 17) is applied to the outer surface of the drum 302 by the distributing structure 310, the supply roll 312 of the distributing structure 310 may be furnished with another elongated strip of material 314 (e.g., strip of material 211 in FIG. 17, which may be the same or a different material than strip of material 210 in FIG. 17) for winding around the drum 302 on top of the strip of material 210 already wound onto the drum 302. The distributing structure 310 may move axially along a side of the drum 302 during winding of the strip of material 211 (see FIG. 17) around the drum 302 onto the strip of material 210, resulting in the strip of material 211 being helically wound around the drum 302 onto the strip of material 210. One of the lines of adhesive 318 (such as coupling lines 314*a* in FIG. 17) may adhere the strips of material 210, 211 (see FIG. 17) together during the first and second passes of the strips of material 314. The adhesive dispenser 316 of the distributing structure 310 may apply another line of adhesive 318 (e.g., line of adhesive 314*c* in FIG. 17) to the strip of material 211 (see FIG. 17) to adhere adjacent layers of the strip of material 211 (see FIG. 17) to one another to define a rear wall 211 of panel 202 in FIG. 17. Thus, the adhesive dispenser 316 may apply three lines of adhesive (e.g., lines of adhesive 314*a*, 314*b*, 314*c* in FIG. 17) during the first and second passes of the strips of material 314 (e.g., strips of material 210, 211 in FIG. 17). The distributing structure 310 may translate in the same axial direction or different axial directions between the front end 304 and the rear end 306 of the drum 302 to apply the first and second passes of the elongated strips of material 314 (e.g., strips of material 210, 211 in FIG. 11).

Referring to FIG. 18, to continue manufacturing the panel 202 of FIG. 17, operations 308, 312, 316 of method 300 may be performed. Operations 308, 312, 316 of method 300 are substantially the same as operations 208, 212, 216 of method 200 previously described in relation to FIGS. 9-15. Thus, operations 308, 312, 316 will not be further described here.

The discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases “at least one”, “one or more”, and “and/or”, as used herein, are open-ended expressions that are both conjunctive and disjunctive in operation. The term “a” or “an” entity, as used herein, refers to one or more of that entity. As such, the terms “a” (or “an”), “one or more” and “at least one” can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader’s understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

We claim:

1. An architectural covering, the covering comprising:

a rotatable roller;

a panel coupled to the roller so that rotation of the roller moves the panel between a retracted position and an extended position, the panel being wound around the roller in the retracted position, the panel comprising:

a first elongated strip of material including a first portion and a second portion separated from the first portion by a first fold; and a second elongated strip of material including a third portion and a fourth portion separated from the third portion by a second fold, the second elongated strip of material overlapped with and coupled to the first elongated strip of material;

wherein the first and second elongated strips of material define an enclosed cell;

wherein each of the first elongated strip of material and the second elongated strip of materials is manufactured from a plurality of layers including a front layer, a rear layer, and an intermediate layer disposed between the front layer and the rear layer;

wherein for each of the first portion of the first elongated strip of material and the third portion of the second elongated strip of material, the intermediate layer comprises a support member such that the first portion of the first elongated strip of material and the third portion of the second elongated strip of material include the front layer, the rear layer, and the support member; and wherein the second portion of the first elongated strip of material and the fourth portion of the second elongated strip of material includes the front layer and the rear layer and does not include the support member.

2. The architectural covering of claim 1, wherein the intermediate layer further includes a blackout material, the second portion of the first elongated strip of material and the fourth portion of the second elongated strip of material includes the blackout material, the first portion of the first elongated strip of material and the third portion of the second elongated strip including the support member and does not include the blackout material.

3. The architectural covering of claim 1, wherein the support member comprises a thermoformable material.

4. The architectural covering of claim 1, wherein:

the first portion forms a front wall of the enclosed cell;

a portion of the third portion forms a bottom wall of the enclosed cell; and the fourth portion forms a rear wall of the enclosed cell.

5. The architectural covering of claim 1, wherein:
the first portion and the third portion are visible from a front side of the panel in the extended position; and
the second portion and the fourth portion are hidden from the front side of the panel in the extended position.

6. The architectural covering of claim 1, wherein:
the fourth portion overlaps and is coupled to the second portion; and
the first portion overlaps a portion of the third portion.

7. The architectural covering of claim 6, wherein:
the first portion transitions into a first tab that is coupled to the portion of the third portion of the second elongated strip of material; and
the first portion is separated from the first tab by a third fold.

8. The architectural covering of claim 7, wherein:
the fourth portion is coupled to the second portion along a first coupling line extending an entire length of the first elongated strip of material; and
the first tab is coupled to the portion of the third portion along a second coupling line extending an entire length of the first elongated strip of material.

9. The architectural covering of claim 8, wherein:
the first coupling line comprises a first line of adhesive; and
the second coupling line comprises a second line of adhesive.

10. The architectural covering of claim 1, wherein:
the first portion and the third portion include a curved profile; and
the second portion and the fourth portion are planar.

11. An architectural covering, the covering comprising:
a rotatable roller;
a panel coupled to the roller so that rotation of the roller moves the panel between a retracted position and an extended position, the panel being wound around the roller in the retracted position, the panel comprising:
a front sheet including a first set of overlapping strips of material; and
a rear support sheet including a second set of overlapping strips of material coupled to each other;
wherein:
the second set of overlapping strips of material include at least first and second elongated overlapping strips of material, each of the first and second elongated overlapping strips of material including a top end portion and a bottom end portion, the bottom end portion of the first elongated overlapping strip of material overlapping with the top end portion of the second elongated overlapping strip of material;
the first set of overlapping strips of material include at least first and second elongated overlapping strips of material, each of the first and second elongated overlapping strips of material of the first set of overlapping strips of material including a first portion and a second portion separated from the first portion by a first fold;
the first portion of the first elongated overlapping strip of material of the first set of overlapping strips of material is coupled to a bottom end portion of the first elongated overlapping strip of material of the second set of overlapping strips of material;
the second portion of the first elongated overlapping strip of material of the first set of overlapping strips of material is coupled to a first portion of the second elongated overlapping strip of material of the first set of overlapping strips of material;
wherein each of the first and second elongated overlapping strips of material of the first set of overlapping strips of material is manufactured from a plurality of layers including a front layer, a rear layer, and an intermediate layer disposed between the front layer and the rear layer; and
wherein the intermediate layer of the first portion of the first overlapping strip of material of the first set of overlapping strips of material comprises a support member so that the first portion includes the front layer, the rear layer, and the support member, the second portion of the first overlapping strip of material of the first set of overlapping strips of material includes the front layer and the rear layer and does not include the support member.

12. The architectural covering of claim 11, wherein the intermediate layer of the second portion of the first overlapping strip of material of the first set of overlapping strips of material comprises a blackout portion so that the second portion includes the front layer, the rear layer, and the blackout material.

13. The architectural covering of claim 11, wherein the support member comprises a thermoformable material.

14. The architectural covering of claim 11, wherein a front surface of the top end portion of the second elongated overlapping strip of material of the second set of overlapping strips of material is coupled to a rear surface of the bottom end portion of the first elongated overlapping strip of material of the second set of overlapping strips of material at a first coupling line.

15. The architectural covering of claim 14, wherein the first portion of the first elongated overlapping strip of material of the first set of overlapping strips of material is coupled to a front surface of the bottom end portion of the first elongated overlapping strip of material of the second set of overlapping strips of material proximate the first coupling line.

16. The architectural covering of claim 15, wherein, in use, the first portion of the first elongated overlapping strips of material of the first set of overlapping strips of material include a second fold positioned between the first coupling line and the first fold.

* * * * *